(12) United States Patent
Iwai et al.

(10) Patent No.: US 11,696,324 B2
(45) Date of Patent: *Jul. 4, 2023

(54) COMMUNICATION APPARATUS AND COMMUNICATION METHOD

(71) Applicant: Panasonic Intellectual Property Corporation of America, Torrance, CA (US)

(72) Inventors: Takashi Iwai, Ishikawa (JP); Yoshio Urabe, Nara (JP); Tomohumi Takata, Ishikawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/353,375

(22) Filed: Jun. 21, 2021

(65) Prior Publication Data
US 2021/0315003 A1 Oct. 7, 2021

Related U.S. Application Data

(63) Continuation of application No. 16/473,368, filed as application No. PCT/JP2018/003944 on Feb. 6, 2018, now Pat. No. 11,071,140.

(30) Foreign Application Priority Data

Feb. 21, 2017 (JP) ................. 2017-030217

(51) Int. Cl.
*H04W 74/00* (2009.01)
*H04W 74/02* (2009.01)
*H04W 84/12* (2009.01)

(52) U.S. Cl.
CPC ......... *H04W 74/006* (2013.01); *H04W 74/02* (2013.01); *H04W 84/12* (2013.01)

(58) Field of Classification Search
CPC ... H04W 74/006; H04W 74/02; H04W 84/12; H04W 74/085; H04W 28/06
See application file for complete search history.

(56) References Cited

U.S. PATENT DOCUMENTS 9,942,010 B1 * 4/2018 Chu ................... H04L 1/1671
10,154,520 B1 * 12/2018 Hedayat ........... H04W 74/0833
(Continued)

FOREIGN PATENT DOCUMENTS

CN 105637969 A 6/2016
CN 106341847 A 1/2017
(Continued)

OTHER PUBLICATIONS

Communication pursuant to Article 94(3) EPC dated Dec. 14, 2020 for the related European Patent Application No. 18757414.0, 11 pages.
(Continued)

*Primary Examiner* — Wutchung Chu
(74) *Attorney, Agent, or Firm* — Seed IP Law Group LLP

(57) ABSTRACT

In an AP, a Trigger frame generator generates a trigger signal instructing an uplink signal transmission, the trigger signal including a terminal information field that includes a terminal ID subfield and a resource unit allocation information subfield, and a radio transmitter/receiver transmits the trigger signal. In a case where the trigger signal includes a first terminal information field specifying one or more contiguous resource units for random access, the Trigger frame generator sets an unused ID that is not to be used as a terminal ID in the first terminal information field.

6 Claims, 26 Drawing Sheets

| Trigger Frame | FC | Duration | Receiver Address | TA | Common Info | User Info AID=2 | User Info AID=1 | User Info AID=2048 | User Info AID=0 | Padding | FCS |
|---|---|---|---|---|---|---|---|---|---|---|---|

(56) References Cited

U.S. PATENT DOCUMENTS

| | | | |
|---|---|---|---|
| 10,277,368 B2* | 4/2019 | Kim | H04L 5/0053 |
| 10,440,740 B2* | 10/2019 | Ghosh | H04W 74/004 |
| 10,880,930 B2* | 12/2020 | Lanante | H04W 72/04 |
| 10,904,920 B1* | 1/2021 | Noh | H04W 72/04 |
| 10,966,214 B2* | 3/2021 | Adachi | H04L 5/0044 |
| 2009/0076303 A1 | 3/2009 | Han et al. | |
| 2015/0146654 A1 | 5/2015 | Chu et al. | |
| 2016/0113034 A1 | 4/2016 | Seok | |
| 2016/0143026 A1 | 5/2016 | Seok | |
| 2016/0219130 A1 | 7/2016 | Ghosh | |
| 2016/0227579 A1 | 8/2016 | Stacey et al. | |
| 2016/0249303 A1* | 8/2016 | Kenney | H04W 52/248 |
| 2016/0323426 A1 | 11/2016 | Hedayat | |
| 2016/0353435 A1 | 12/2016 | Ghosh | |
| 2017/0026151 A1 | 1/2017 | Adachi | |
| 2017/0055290 A1 | 2/2017 | Lv et al. | |
| 2017/0127428 A1* | 5/2017 | Adachi | H04L 5/0053 |
| 2017/0127453 A1* | 5/2017 | Adachi | H04W 74/0833 |
| 2018/0020372 A1* | 1/2018 | Viger | H04W 28/0278 |
| 2018/0020373 A1* | 1/2018 | Viger | H04W 72/52 |
| 2018/0077735 A1* | 3/2018 | Ahn | H04W 72/1268 |
| 2018/0184453 A1* | 6/2018 | Viger | H04W 74/085 |
| 2018/0205441 A1* | 7/2018 | Asterjadhi | H04W 74/06 |
| 2018/0242355 A1 | 8/2018 | Lou et al. | |
| 2018/0302858 A1* | 10/2018 | Son | H04W 74/08 |
| 2019/0007977 A1* | 1/2019 | Asterjadhi | H04W 74/0833 |
| 2019/0082461 A1* | 3/2019 | Guo | H04W 74/02 |
| 2019/0150189 A1* | 5/2019 | Ghosh | H04W 74/008 370/329 |
| 2019/0173649 A1* | 6/2019 | Lin | H04W 72/121 |
| 2019/0182864 A1* | 6/2019 | Huang | H04L 5/0094 |
| 2019/0281640 A1* | 9/2019 | Lanante | H04W 74/0808 |
| 2019/0313466 A1* | 10/2019 | Ko | H04W 74/08 |
| 2020/0107282 A1* | 4/2020 | Segev | H04J 11/0073 |

FOREIGN PATENT DOCUMENTS

| | | |
|---|---|---|
| CN | 107852204 A | 3/2018 |
| JP | 2001-237389 A | 8/2001 |
| KR | 10-2012-0099354 A | 9/2012 |
| RU | 2572566 C2 | 1/2016 |
| WO | 2015/031443 | 3/2015 |
| WO | 2016/053024 | 4/2016 |
| WO | 2016/177089 | 11/2016 |
| WO | 2016/186420 A1 | 11/2016 |
| WO | 2017/011274 | 1/2017 |

OTHER PUBLICATIONS

Evgeny Khorov (IITP RAS): Random Access RU Allocation in the Trigger Frame, IEEE Draft; 11-16-0582-03-00AX-RANDOM-ACCESS-RU-ALLOCATION-IN-THE-TRIGGER-FRAME, IEEE-SA Mentor, Piscataway, NJ USA, vol. 802.11ax, No. 3 May 18, 2016 (May 18, 2016), pp. 1-24, XP068119389, Retrieved from the Internet: URL:https://mentor.ieee.org/802.11/dcn/16/11-16-0582-03-00ax-random-access-ru-allocation-in-the-trigger-frame.pptx [retrieved on May 18, 2016].

IEEE 802.11-15/0132r15, "Specification Framework for TGax", May 25, 2016 (All pages).
IEEE 802.11-15/0132r15, "Specification Framework for TGax", May 25, 2016 (pp. 39-40,48-51).
IEEE 802.11-16/0024r1, "Proposed TGax draft specification", Mar. 2, 2016.
IEEE 802.11-16/0352r1, "Considerations on MU initial link setup", Mar. 15, 2016.
IEEE 802.11-16/0591r1, "Issues related to OCW management", May 16, 2016.
IEEE 802.11-16/0617r1, "Remaining Topics in Power Control", May 16, 2016.
IEEE 802.11-16/0725r3, "CIDs for: Trigger Frame Format Comment Resolution—Type Dependent Per user information section 9.3.1.23", May 18, 2016.
IEEE 802.11-16/0806r0, "HE Variant HT Control—Buffer Status Report", Jul. 6, 2016.
IEEE 802.11-16/0938r0, "Resolution for CID 1589, 1590, 2668 and 2669 on Multi-TID Aggregation in Sub-clause 25.10.4", Jun. 18, 2016.
IEEE 802.11-16/1516r1, "CIDs for: Section 9.3.1.23 Random Access CIDs", Nov. 4, 2016.
IEEE Computer Society, "Draft Standard for Information technology—Tele-communications and information exchange between systems Local and metropolitan area networks—Specific requirements", Part 11: Wireless LAN Medium access Control (MAC) and Physical Layer (PHY) Specifications, Amendment 6: Enhancements for High Efficiency WLAN(#1121), IEEE P802.11ax/D0.5, Sep. 2016, New York, New York, 376 pages.
International Search Report of PCT application No. PCT/JP2018/003944 dated May 1, 2018.
LAN/MAN Standards Committee of the IEEE Computer Society: Draft Standard for Information technology—Telecommunications and information exchange between systems Local and metropolitan area networks—Specific requirement0582s, Part 11: Wireless LAN Medium Access Control (MAC) and Physical Layer (PHY) Specifications, Amendment 6: Enhancements for High Efficiency WLAN, IEEE Draft; Draft P802.11AX_D1.1, IEEE-SA, Piscataway, NJ USA, vol. 802.11ax drafts, No. D1.1 Feb. 10, 2017 (Feb. 10, 2017), pp. 1-465, XP068137461, Retrieved from the Internet: URL:www.ieee802.org/11/private/Draft_Standards/11ax/DraftP802.11ax_D1.1.pdf [retrieved on Feb. 10, 2017].
Leonardo Lanante (Kyutech): "Random Access UL MU Resource Allocation and Indication; 1-16-0340-01-00ax-random-access-ul-mu-resource-allocation-and-indication", IEEE Draft; 11-16-0340-01-00AX-RANDOM-ACCESS-UL-MU-RESOURCE-ALLOCATION-AND-INDICATION, IEEE—Samentor, Piscataway, NJ USA, vol. 802.11ax, No. 1, Mar. 14, 2016 (Mar. 14, 2016), pp. 1-11, XP068105209, [retrieved on Mar. 14, 2016].
The Extended European Search Report dated Jan. 31, 2020 for the related European Patent Application No. 18757414.0.
Ghosh et al., Intel, "Random Access with Trigger Frames using OFDMA," IEEE 802.11-15/0604r0, May 11, 2015, (16 pages).
Banerjea, Qualcomm Inc., "Comment resolution for Random Access CIDs," IEEE 802.11-17/0284r0, IEEE P802.11 Wireless LANs, Feb. 22, 2017. (3 pages).
English Translation of Taiwan Search Report dated May 10, 2022 for the related Taiwan Patent Application No. 111103399.

* cited by examiner

FIG. 2

| Common Info | Trigger Type | Length | ... | HE-SIG-A Reserved | Rserved | Trigger Dependent Common Info |
|---|---|---|---|---|---|---|
| Bits: | 4 | 12 | | 10 | 1 | Variable |

FIG. 3

| Trigger Type value | Trigger Type description |
|---|---|
| 0 | Basic Trigger |
| 1 | Beamforming Report Poll Trigger |
| 2 | MU-BAR |
| 3 | MU-RTS |
| 4-TBD | Reserved |

Trigger Type

FIG. 4

| User Info | AID12 | RU Allocation | Coding Type | MCS | DCM | SS Allocation | Target RSSI | Reserved | Trigger Dependent User Info |
|---|---|---|---|---|---|---|---|---|---|
| Bits: | 12 | 8 | 1 | 4 | 1 | 6 | 7 | 1 | Variable | ial
COMMUNICATION APPARATUS AND COMMUNICATION METHOD

CROSS-REFERENCE TO RELATED APPLICATIONS

This application is a Continuation of U.S. application Ser. No. 16/473,368 filed Jun. 25, 2019, which is a U.S. national stage application of the PCT International Application No. PCT/JP2018/003944 filed on Feb. 6, 2018, which claims the benefit of foreign priority of Japanese patent application 2017-030217 filed on Feb. 21, 2017, the contents all of which are incorporated herein by reference.

TECHNICAL FIELD

The present disclosure relates to a communication apparatus and a communication method.

BACKGROUND ART

In IEEE (the Institute of Electrical and Electronics Engineers) 802.11 Working Groups, a Task Group ax has been working to establish technical specifications of IEEE 802.11ax (hereinafter, referred to as "11 ax") as a next version of 802.11ac standard. In 11ax, Random Access (RA) based on OFDMA (Orthogonal Frequency-Division Multiple Access) has been introduced.

An Access Point (AP, also called a "base station") transmits, to a plurality of terminals (also called STAs (Stations)) associated with the AP, a control signal to instruct them to transmit an uplink OFDMA signal (hereinafter, this control signal is referred to as a "Trigger frame").

In the Trigger frame, a Common Info field and a User Info field are defined. The Common Info field includes information which is common among a plurality of terminals multiplexed by OFDMA. The User Info field includes information specific to each of the terminals multiplexed by the OFDMA (see, for example, NPL 1 and NPL 4).

The Common Info field includes a Trigger Type subfield specifying a Trigger Type indicating a type of the Trigger frame (a type of a signal instructed to a terminal, by the AP, to transmit) (see, for example NPL 2 and NPL 3).

The User Info field includes an AID12 subfield used to inform of an Association ID (AID) which is an ID uniquely assigned to a terminal when the terminal is associated. Hereinafter, a "Scheduled access" denotes a method in which an AID assigned to a specific terminal is informed to the terminal thereby allocating a frequency resource unit (RU) to the terminal. Furthermore, in 11ax, it has been agreed that by setting one of unused AIDs such that AID=0, each terminal is informed that a frequency resource (RU) specified in an RU Allocation subfield in a User Info field is an RU for RA (RA-RU) (for example, see NPL 1).

Furthermore, in a meeting of 11ax, it has been further agreed that a Trigger frame may include a new User Info field (called a "modified User Info") dedicated for RA (NPL 5). In the modified User Info, one User Info field specifies one or more contiguous RA-RUs for a terminal.

CITATION LIST

Non Patent Literature

NPL 1: IEEE 802.11-15/0132r17 "Specification Framework for TGax"

NPL 2: IEEE 802.11-16/0024r1 "Proposed TGax draft specification"

NPL 3: IEEE 802.11-16/0806r0 "HE Variant HT Control-Buffer Status Report"

NPL 4: IEEE 802.11-16/0617r1 "Remaining Topics in Power Control" NPL 5: IEEE 802.11-16/1516r1 "CIDs for: Section 9.3.1.23 Random Access CIDs"

NPL 6: IEEE 802.11-16/0725r3 "CIDs for: Trigger Frame Format Comment Resolution-Type Dependent Per user information section 9.3.1.23"

NPL 7: IEEE 802.11-16/0938r1 "Resolution for CID 1589, 1590, 2668, and 2669 on Multi-TID Aggregation in Sub-clause 25.10.4"

SUMMARY OF INVENTION

However, no sufficient discussion has been made as to how to apply the modified User Info in the Trigger frame.

In an aspect, the present disclosure provides a communication apparatus and a communication method capable of properly setting the modified User Info in the Trigger frame.

According to an aspect of the present disclosure, a communication apparatus includes a trigger signal generator that generates a trigger signal instructing an uplink signal transmission, the trigger signal including a terminal information field that includes a terminal ID subfield and a resource unit allocation information subfield, wherein in a case where the trigger signal includes a first terminal information field specifying one or more contiguous resource units for random access, an unused ID that is not to be used as a terminal ID is set in the terminal ID subfield in the first terminal information field, and a transmitter that transmits the generated trigger signal.

General or specific embodiments may be implemented as a system, an apparatus, a method, an integrated circuit, a computer program, or a storage medium or any combination of a system, an apparatus, a method, an integrated circuit, a computer program, and a storage.

According to the aspect of the present disclosure, it is possible to properly set the modified User Info in the Trigger frame.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 2 is a diagram illustrating a format of a Common Info field of a Trigger frame.

FIG. 3 is a diagram illustrating a Trigger Type of a Trigger frame.

FIG. 4 is a diagram illustrating a format of a User Info field of a Trigger frame.

DESCRIPTION OF EMBODIMENTS

Embodiments of the present disclosure are described in detail below with reference to drawings. In the embodiments described below, similar elements are denoted by similar reference symbols, and a duplicated description thereof is omitted.

First Embodiment

[Trigger Frame]

Figure 1:
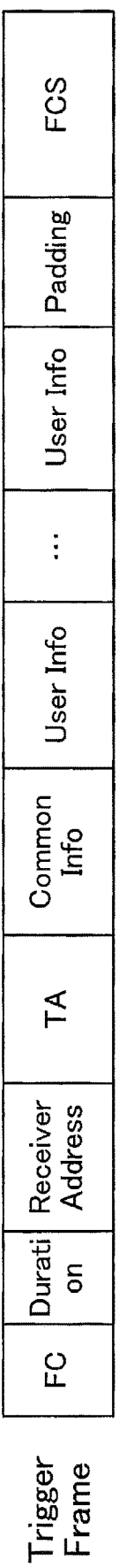
FIG. 1 is a diagram illustrating a format of a Trigger frame.

FIG. 1 is a diagram illustrating an example of a format of a Trigger frame which is under discussion in 11ax. The Trigger frame defines a Common Info field including information which is common among a plurality of terminals multiplexed by OFDMA and a User Info field including specific information to each of terminals multiplexed by OFDMA (see, for example, NPL 1).

FIG. 2 is a diagram illustrating an example of a format of a Common Info field of a Trigger frame (see, for example, NPL 1). A Trigger Type subfield specifies a Trigger Type. FIG. 3 illustrates defined Trigger Types (see, for example, NPL 2). It is under discussion to define an additional Trigger Type for instructing a terminal to report transmission buffer information (hereinafter referred to as Buffer Status Report Poll (BSRP)) in addition to the defined Trigger Types shown in FIG. 3 (see, for example, NPL 3). A Trigger Dependent Common Info subfield may include terminal-common information suitable for (dependent on) a specific Trigger type.

FIG. 4 is a diagram illustrating an example of a format of a User Info field of a Trigger frame (see, for example, NPL 1 and NPL 4). In the format shown in FIG. 4, the size of a Target RSSI subfield, which was not yet determined in NPL 1, is determined to be seven bits according to a suggestion in NPL 4. An AID12 subfield is used to inform of an AID. When the AID is set such that AID=0, it is indicated that the RU specified in a User Info field is an RA-RU (see, for example, NPL 1). A Trigger Dependent User Info subfield may include terminal-specific information suitable for (dependent on) a specific Trigger type.

Hereinafter, a User Info field specifying a radio resource for a terminal in units of RUs is denoted as "normal User Info" to distinguish from the "modified User Info". The normal User Info and the modified User Info may be generically referred to as "User Info".

Furthermore, in 11ax, as one of Trigger Types, a Basic Trigger is defined. In the Basic Trigger, the format of an uplink signal is not limited to specific ones (see, for example, FIG. 3). As a response to the Basic Trigger, a response using Scheduled access and a response using random access are allowed. In a case where the Trigger Type is the Basic Trigger, the Trigger Dependent User Info subfield of the User Info field includes information (restriction information) indicating a restriction on the transmission of the uplink signal as shown in FIG. 5 (see, for example, NPL 6 and NPL 7).

Figure 5:
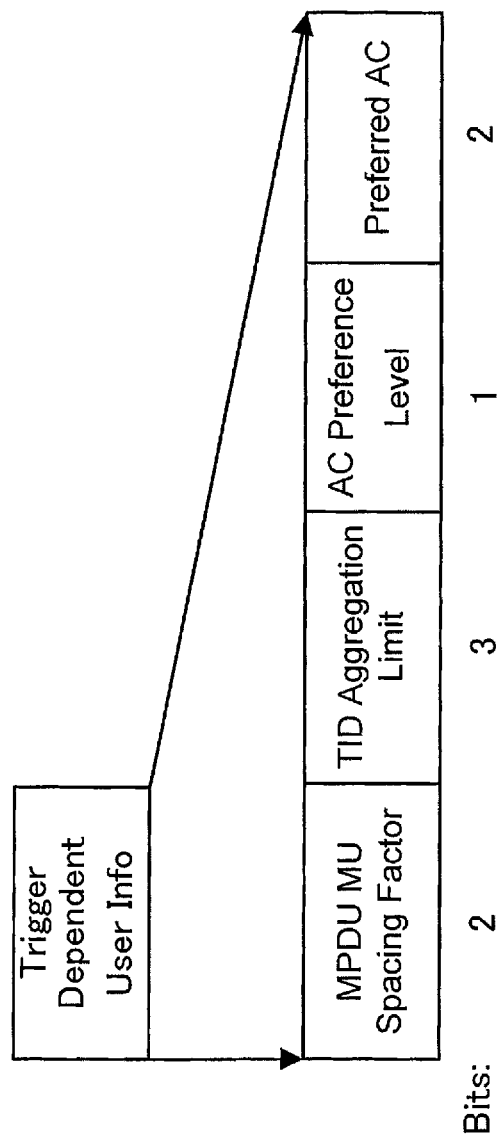
FIG. 5 is a diagram illustrating a format of a User Info field of Trigger Dependent User Info field.

More specifically, as shown in FIG. 5, a Type dependent Per User Info subfield includes a 2-bit "MPDU MU Spacing Factor" indicating a minimum allowable interval of an MPDU (an MAC protocol data unit) processable by the AP, a 3-bit "TID Aggregation Limit" indicating a maximum number of TIDs included in the MPDU, a 1-bit "AC Preference Level" functioning as a flag indicating whether to specify an Access Category (AC, a type of transmission data) recommended by the AP, and a 2-bit "Preferred AC" indicating a parameter indicating an AC recommended by the AP. These are parameters for using an A-MPDU (Aggregate MAC protocol data unit), which is an aggregate of a plurality of MPDUs, as an uplink signal in response to a Trigger frame, or parameters for specifying AC to be transmitted.

[Modified User Info]

Figure 6A:
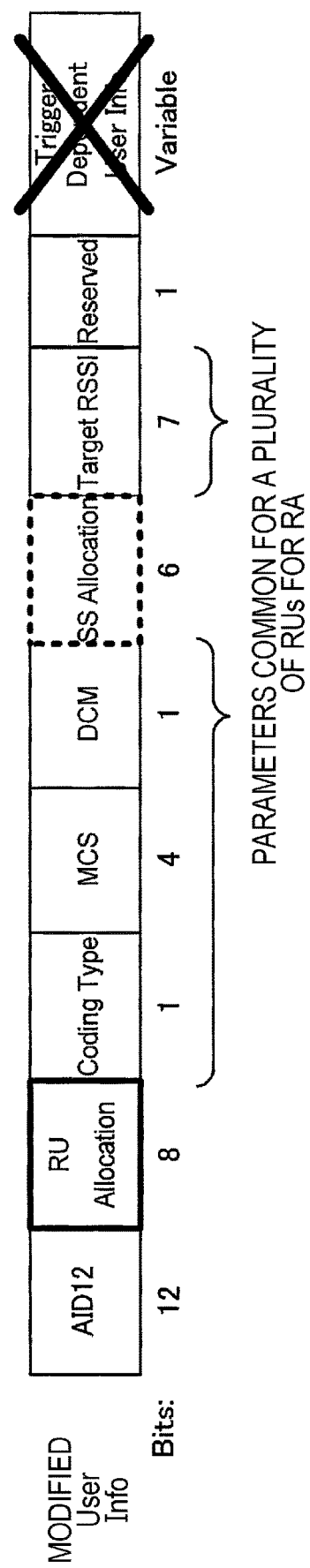
FIG. 6A is a diagram illustrating a format of a modified User Info field of a Trigger frame.

FIG. 6A is a diagram illustrating an example of a format of a modified User Info.

In the Trigger frame using the normal User Info, one arbitrary RU is specified using one User Info field. That is, in the Trigger frame using the normal User Info, to specify a plurality of RA-RUs, a plurality of User Info fields are used.

Figure 6B:
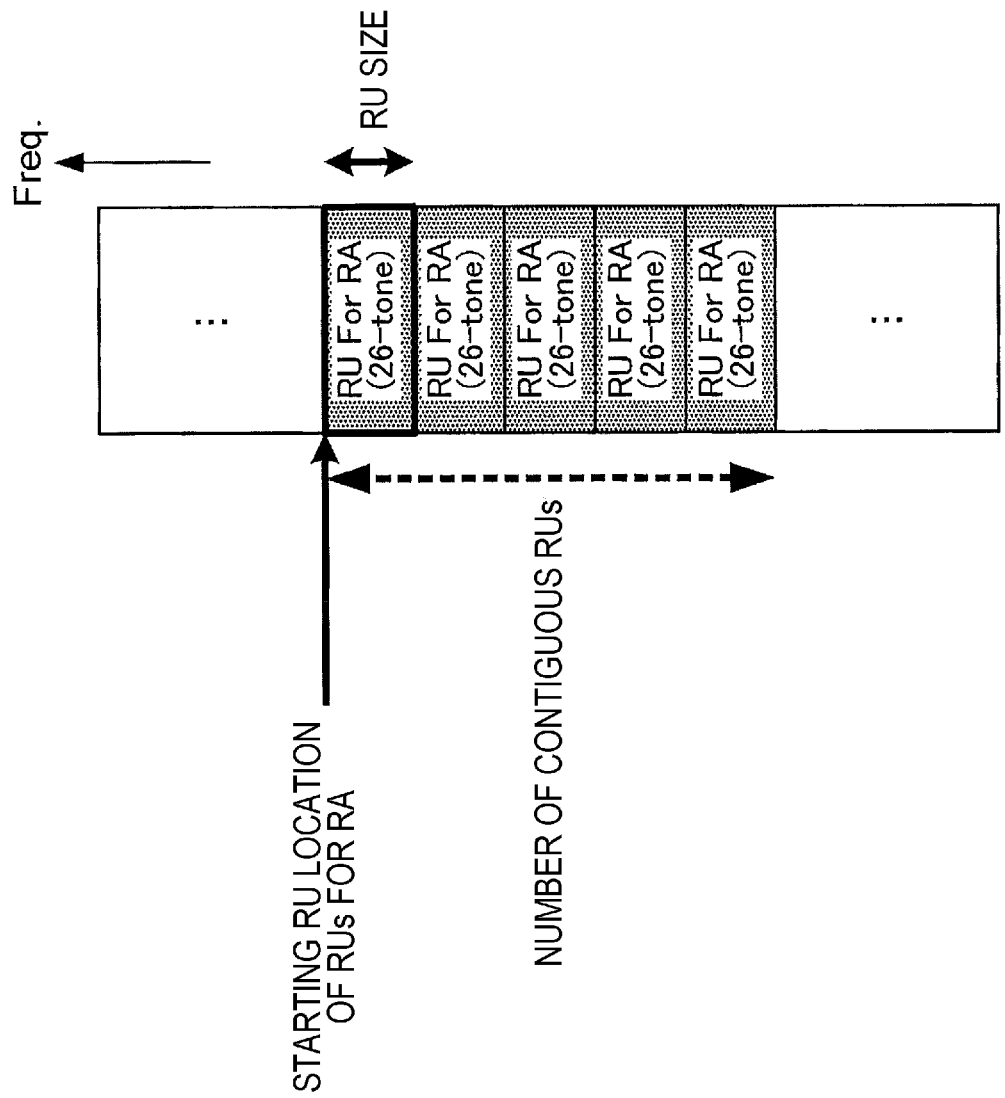
FIG. 6B is a diagram illustrating an example of an RA-RU specified by a modified User Info field.

In contrast, in the modified User Info, locations of specified RUs are limited to one continuous band. This makes it possible to specify a plurality of RUs using one modified User Info field. For example, in the modified User Info shown in FIG. 6A, an RU Allocation subfield specifies a starting RU location of a continuous band of RA-RUs and a size of an RU (see FIG. 6B). Furthermore, in the modified User Info, when the number of spatially multiplexed streams in transmission of RA-RUs is limited to "1" (that is, MIMO is not used), an SS Allocation subfield shown in FIG. 6A specifies not the number of spatially multiplexed streams but the number of RA-RUs (the number of contiguous RUs) starting at the RA-RU notified by the RU Allocation subfield (see FIG. 6B). Note that the RU size of each RA-RU is specified by the RU size notified by the RU Allocation subfield. Information described in a Coding Type, MCS, DCM, and Target RSSI subfields of the modified User Info shown in FIG. 6A are common for a plurality of RA-RUs specified by the RU Allocation and the SS Allocation.

Furthermore, in the modified User Info, as shown in FIG. 6A, the Trigger Dependent User Info subfield is deleted. In the Trigger frame using the modified User Info, the Trigger Dependent Common Info subfield is deleted. As a result, a reduction in the Trigger frame size is achieved.

As described above, in the modified User Info, a part of parameters specified by the normal User Info are shared by a plurality of RUs (a plurality of terminals) such that one or more contiguous RA-RUs are specified by one User info field thereby achieving a reduction in the Trigger frame size.

The modified User Info has been described above.

According to the present disclosure, a method of applying the modified User Info in the Trigger frame is described below.

For example, to apply the modified User Info, a new Trigger Type specifying RA transmission (hereinafter, referred to as "RA trigger") may be added in Reserved of the Trigger Type subfield shown in FIG. 3. When the RA trigger is specified as the Trigger Type, use of the modified User Info allows a reduction in the Trigger frame size. Furthermore, when the RA trigger is specified as the Trigger Type, by deleting the Trigger Dependent Common Info subfield and the Trigger Dependent User Info subfield, it becomes possible to reduce the Trigger frame size.

However, specifying the modified User Info by the RA Trigger described above uses (consumes) the Reserved field of the Trigger type, which results in a reduction in room of a further extension of the standard.

Furthermore, the RA Trigger is allowed to be specified only by the modified User Info, and thus only one contiguous-RU group can be specified by one parameter. Therefore, in a case where a part of RUs existing in a system band are expected to have performance degradation (for example, an RU located near a DC or an RU in which interference is observed), it is necessary to set high-error-resilience robust parameters (for example, MCS) for all RUs specified by the modified User Info, and thus a reduction in throughput occurs.

In view of the above, the present disclosure provides a method of specifying a plurality of RA-RUs by a small-size Trigger frame using a modified User Info while maintaining the future extensibility of the Trigger Type (that is, without adding a new Trigger type such as an RA Trigger or the like), and a method of specifying an RU-specific parameter even in a case whether the modified User Info is employed.

[Configuration of Wireless Communication System]

In the present embodiment, a wireless communication system includes an AP (radio transmission apparatus) 100 and a terminal (radio reception apparatus) 200. The AP 100 transmits a Trigger frame instructing RA transmission to the terminal 200. The terminal 200 receives the Trigger frame, and transmits an RA to the AP 100 using a resource specified in the Trigger frame.

Figure 7:
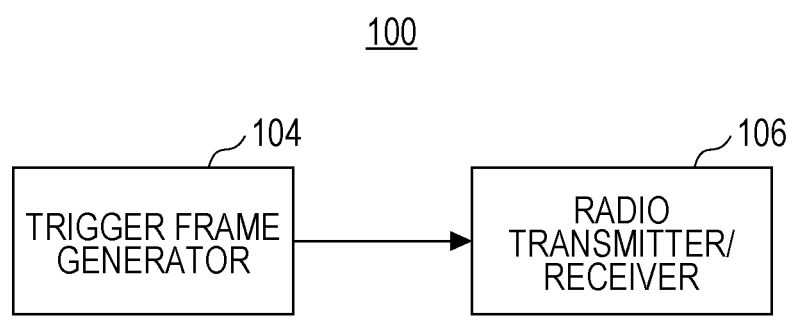
FIG. 7 is a block diagram illustrating an example of a partial configuration of an AP according to a first embodiment.

FIG. 7 is a block diagram partially illustrating a configuration of the AP 100 according to the present embodiment. In the AP 100 shown in FIG. 7, a Trigger frame generator 104 generates a Trigger frame (a trigger signal) instructing to transmit an uplink signal. A radio transmitter/receiver 106 transmits the Trigger frame. In a case where the Trigger frame includes a modified User Info field (a first terminal information field) specifying one or more contiguous RA-RUs, the Trigger frame generator 104 sets an unused AID, which is not to be used as an AID (a terminal ID), in an AID12 subfield (terminal ID subfield) in the modified User Info field.

[Configuration of AP]

Figure 8:
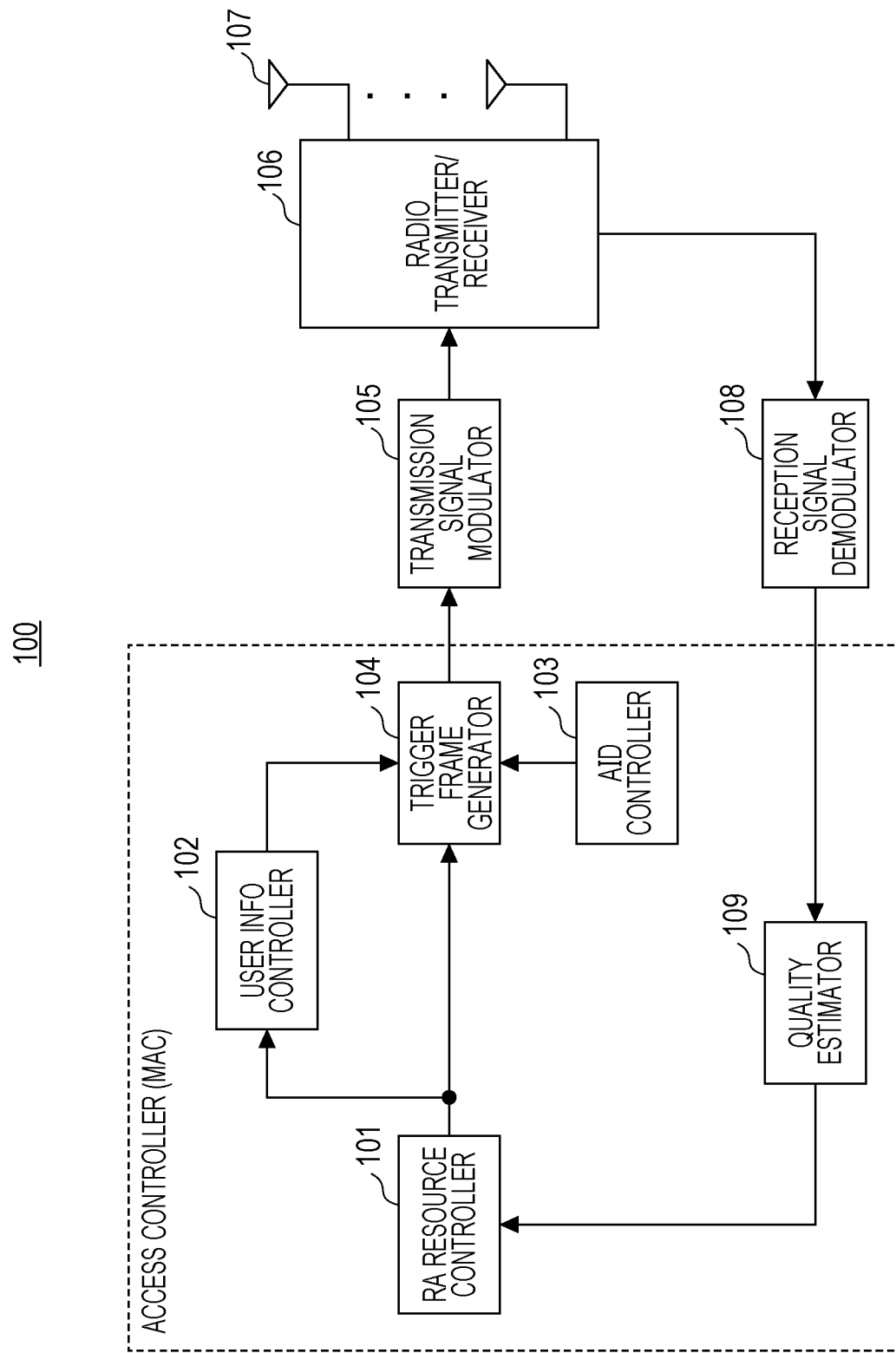
FIG. 8 is a block diagram illustrating an example of a configuration of an AP according to the first embodiment.

FIG. 8 is a block diagram illustrating a configuration of the AP 100 according to the present embodiment. The AP 100 generates a Trigger frame (a trigger signal) to instruct the terminal 200 to transmit an uplink signal (for example, an RA signal), and transmits the generated Trigger frame to the terminal 200.

In FIG. 8, the AP 100 includes an RA resource controller 101, a User Info controller 102, an AID controller 103, a Trigger frame generator 104, a transmission signal modulator 105, a radio transmitter/receiver 106, an antenna 107, a reception signal demodulator 108, and a quality estimator 109. The radio transmitter/receiver 106 includes a transmitter and a reception unit. The RA resource controller 101, the User Info controller 102, the AID controller 103, the Trigger frame generator 104, and the quality estimator 109 together form a media access control (MAC) unit.

The RA resource controller 101 determines a band to be allocated to an RA-RU within a system band based on the reception quality for each RU with a predetermined size output from the quality estimator 109. The RA resource controller 101 outputs RA resource information indicating the band to which the RA-RU is allocated to the User Info controller 102 and the Trigger frame generator 104.

The RA resource information includes, for example, information associated with RA-RUs allocated within the system band, control information for generating the RA signal (Coding Type, MCS, DCM, SS Allocation, and Target RSSI included in the User Info field), and/or the like. For example, for an RU with a low reception quality such as an RU overlapping with a band, used by another service, in the system band, an RU corresponding to a DC frequency in a baseband when being demodulated, an RU subject to relative strong interference, or the lie, the RA resource controller 101 may apply a high-error-resilience MCS (for example, BPSK) or a relatively high target RSSI level (for example, −60 dBm). For another RU subject to relatively low interference, the RA resource controller 101 may apply an MCS (for example, 16QAM) that provides a higher transmission efficiency or a target RSSI level (for example, −70 dBm) that causes less interference to another terminal.

The User Info controller 102 controls the User Info field included in the Trigger frame based on the RA resource information output from the RA resource controller 101, and outputs a control result to the Trigger frame generator 104.

More specifically, the User Infor controller 102 determines a User Infor field format (the modified User Info or the normal User Info) to be used and an RA-RU to be specified by the User Info field. For example, in a case where the modified User Info is used, the User Infor controller 102 determines to specify a plurality of RA-RUs in the RU Allocation and the SS Allocation of the User Info field and specify a parameter that is common for these RA-RUs. On the other hand, in a case where the normal User Info is used, the User Info controller 102 determines to specify one RA-RU in the User Info field and specify an individual parameter associated with the RA-RU.

The AID controller 103 determines an AID (information described in the AID12 subfield of the Trigger frame) for specifying a format of the User Info field (the modified User Info or the normal User Info). The AID controller 103 outputs AID information indicating the determined AID to the Trigger frame generator 104.

For example, the AID controller 103 may set, as the AID for specifying the RA-RU, an unused AID (in the specifications for 11 ax, one of AID=0, 2008 to 4094) which is not to be used as a terminal-specific AID for Scheduled access. Details of the definition of the AID for specifying the format of the User Info field will be described later.

The Trigger frame generator (the trigger signal generator) 104 generates a Trigger frame for instructing the terminal 200 to perform an RA transmission (for example, an OFDMA-based RA transmission) (see, for example, FIG. 1, FIG. 2, FIG. 4, and FIG. 6A). More specifically, based on information output from the User Info controller 102, the Trigger frame generator 104 sets, in the respective subfields of the User Info field, parameters indicated by the RA resource information output from the RA resource controller 101.

For example, in a case where the modified User Info is employed, based on the RA resource information (allocation of RA-RU) output from the RA resource controller 101, the Trigger frame generator 104 sets a starting RU location and an RU size of RA-RUs located in a continuous band in the RU Allocation subfield and sets the number of contiguous RA-RUs in the SS allocation subfield. On the other hand, in a case where the normal User Info is employed, based on the RA resource information (allocation of RA-RU) output from the RA resource controller 101, the Trigger frame generator 104 sets a starting location and an RU size of one RA-RU in the RU Allocation subfield.

Furthermore, based on information output from the AID controller 103 and information output from the User Info controller 102, the Trigger frame generator 104 sets an AID corresponding to a format of the User Info field in the AID12 subfield of the Trigger frame.

The Trigger frame generator 104 then outputs the generated Trigger frame (the trigger signal) to the transmission signal modulator 105.

The transmission signal modulator 105 performs a coding-and-modulating process on the Trigger frame output from the Trigger frame generator 104. Furthermore, the transmission signal modulator 105 adds, to the modulated signal, control signals (also called preamble) such as a pilot signal used in frequency synchronization and timing synchronization at a receiving end (the terminal 200), a channel estimation signal, and/or the like thereby generating a radio frame (a transmission signal), and the transmission signal modulator 105 outputs the resultant the radio frame (the transmission signal) to the radio transmitter/receiver 106.

The radio transmitter/receiver 106 performs a predetermined radio transmission process including a D/A conversation, a frequency up-conversion to a carrier frequency, and the like on the radio frame (the transmission signal) output from the transmission signal modulator 105, and the radio transmitter/receiver 106 transmits the resultant signal subjected to the radio transmission process to the terminal 200 via the antenna 107. The radio transmitter/receiver 106 receives a signal transmitted from the terminal 200 via the antenna 107, and performs a predetermined radio reception process including a down-conversion to a baseband, an A/D conversion, and the like on the received signal, and the radio transmitter/receiver 106 outputs the resultant signal subjected to the radio reception process to the reception signal demodulator 108.

The reception signal demodulator 108 extracts a radio frame by performing autocorrelation processing or the like on the signal output from the radio transmitter/receiver 106, and outputs the extracted radio frame to the quality estimator 109.

The quality estimator 109 estimates reception quality of each RU with the predetermined size by using the pilot signal included in the radio frame output from the reception signal demodulator 108, and outputs an estimation result to the RA resource controller 101.

[Configuration of Terminal]

Figure 9:
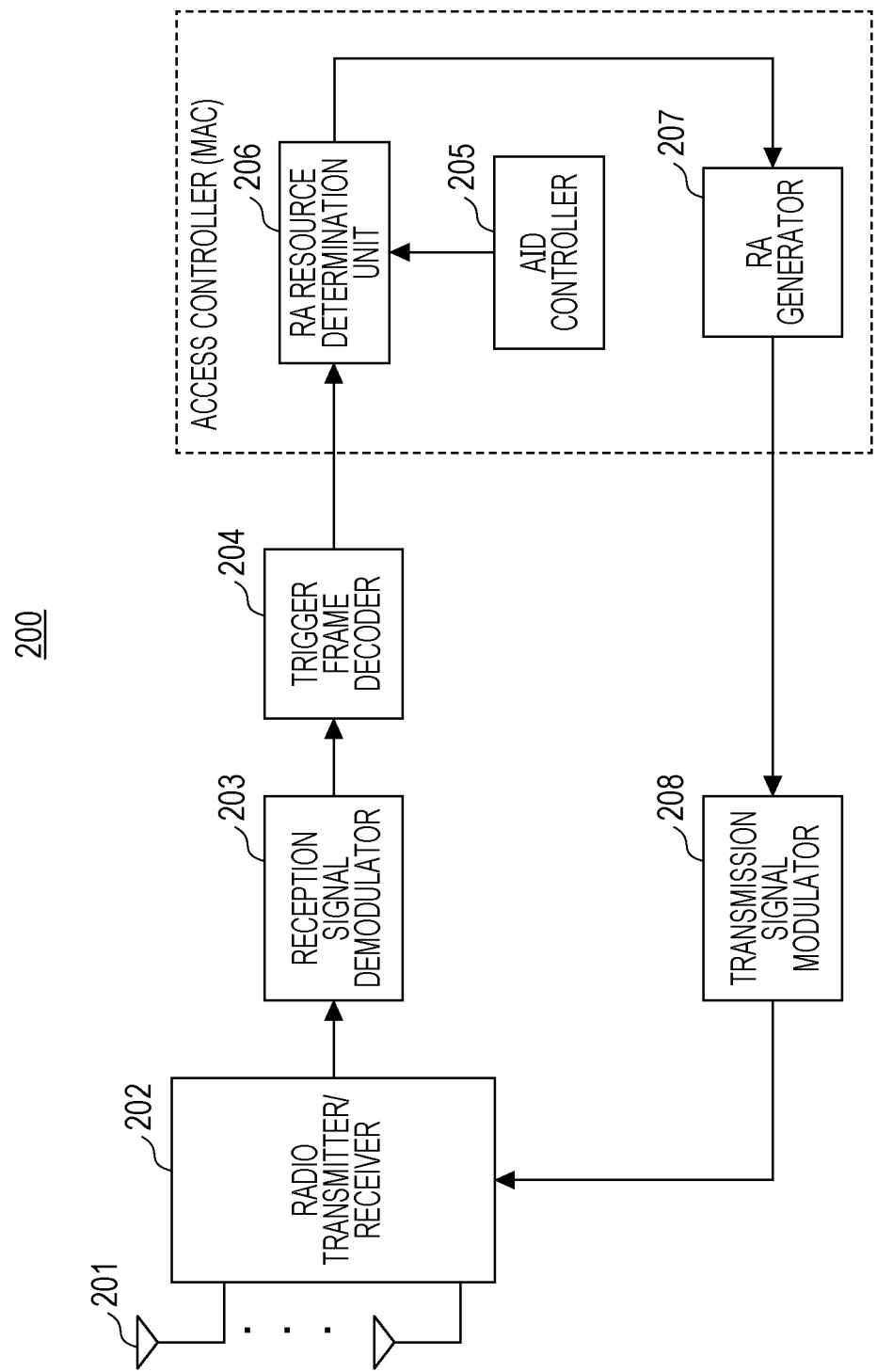
FIG. 9 is a block diagram illustrating a configuration of a terminal according to the first embodiment.

FIG. 9 is a block diagram illustrating a configuration of the terminal 200 according to the present embodiment. The terminal 200 receives the Trigger frame instructing an RA transmission from the AP 100, randomly selects one RU from the RA-RUs specified in the Trigger frame, and the transmits an RA signal to the AP 100.

In FIG. 9, the terminal 200 includes an antenna 201, a radio transmitter/receiver 202, a reception signal demodulator 203, a Trigger frame decoder 204, an AID controller 205, an RA resource determination unit 206, an RA generator 207, and a transmission signal modulator 208. The radio transmitter/receiver 202 includes a transmitter and a reception unit. The AID controller 205, the RA resource determination unit 206, and the RA generator 207 together form an access controller (MAC).

The radio transmitter/receiver 202 receives the Trigger frame instructing the RA transmission transmitted from the AP 100 via the antenna 201, and performs a predetermined radio reception process including a down-conversion to the baseband, an A/D conversion, and/or the like on the received signal, and the radio transmitter/receiver 202 outputs the resultant signal subjected to the radio reception process to the reception signal demodulator 203. The radio transmitter/receiver 202 performs a predetermined radio transmission process including a D/A conversion, an up-conversion to a carrier frequency, and the like on the signal output from the transmission signal modulator 208 described later, and the radio transmitter/receiver 202 transmits the resultant signal subjected to the radio transmission process to the AP 100 via the antenna 201.

The reception signal demodulator 203 extracts a radio frame (a Trigger frame) by performing an autocorrelation processing or the like on the signal output from the radio transmitter/receiver 202, and outputs the resultant extracted radio frame (the Trigger frame) to the Trigger frame decoder 204.

The Trigger frame decoder 204 detects the format of the User Info field included in the Triger frame output from the reception signal demodulator 203, decodes the Trigger frame, and outputs the resultant decoded Trigger frame to the RA resource determination unit 206.

The AID controller 205 operates in a similar manner to the AID controller 103 of the AP 100. More specifically, the AID controller 205 determines an AID (information described in the AID12 subfield of the Trigger frame) for specifying a format (the modified User Info or the normal User Info) of the User Info field. The AID controller 205 outputs AID information indicating the determined AID to the RA resource determination unit 206. Details of the definition of the AID for specifying the format of the User Info field will be described later.

Based on the AID information output from the AID controller 205 and the information described in the Trigger frame output from the Trigger frame decoder 204, the RA resource determination unit 206 determines an RA-RU and control information for generating an RA signal. The RA resource determination unit 206 outputs the determined control information for generating an RA-RU and an RA signal to the RA generator 207.

More specifically, based on the AID information, the RA resource determination unit 206 identifies the format (the modified User Info or the normal User Info) of the User Info field corresponding to the AID included in the AID12 subfield of the Trigger frame output from the Trigger frame decoder 204.

In a case where the format of the User Info field is the modified User Info, the RA resource determination unit 206 identifies the starting location and the RU size of the RA-RUs from the RU Allocation subfield, identifies the number of RA-RUs (the number of contiguous RUs) from the SS Allocation subfield, applies other parameters specified in the respective subfields of the modified User Info field, in common, to the plurality of RA-RUs, and determines an RA-RU by randomly selecting one of the plurality of RA-RUs.

On the other hand, in a case where the format of the User Info field is the normal User Info, the RA resource determination unit 206 identifies the starting location and the RU size of one RA-RU from the RU Allocation subfield, and applies other parameters specified in the respective subfields (including the SS allocation subfield) of the normal User Info field individually to one RA-RU.

Based on the control information for generating the RA-RU and the RA signal output from the RA resource determination unit 206, the RA generator 207 generates an RA signal including the terminal ID and the transmission information (data or control information or the like) associated with the terminal 200, and outputs the resultant RA signal to the transmission signal modulator 208.

The transmission signal modulator 208 performs coding/modulating on the RA signal. The transmission signal modulator 208 adds, to the modulated signal, a control signal (preamble) such as a pilot signal used in frequency synchronization and timing synchronization at the AP 100, a channel estimation signal, and/or the like thereby generating a radio frame (a transmission signal), and the transmission signal modulator 208 outputs the resultant the radio frame (the transmission signal) to the radio transmitter/receiver 202. Note that the RA signal is frequency-mapped to the RA-RU indicated by the information determined by the RA resource determination unit 206.

[Operations of AP 100 and Terminal 200]

Operations of the AP 100 and the terminal 200 according to the present embodiment are described in detail below.

The AP 100 (the Trigger frame generator 104) sets an unused AID in the AID12 subfield (terminal ID subfield) of the modified User Info specifying one or more contiguous RA-RUs in the Trigger frame thereby notifying the terminal 200 that the User Info field including the unused AID is the modified User Info.

Note that the unused AID is a terminal-specific AID for Scheduled access (that is, a scheduled AID assigned to the terminal 200) (in the present specifications of 11ax, the unused AID is 0 or one of 2008 to 4094).

As described above, by specifying, using an unused AID, that the modified User Info is to be employed, it is possible to specify a plurality of RA-RUs using the modified User Info in the small-size Trigger frame while maintaining the future extensibility of the Trigger Type (that is, without newly adding an RA Trigger as one of Trigger Types).

Specific examples 1 and 2 of methods of specifying the format of the User Info field using an unused AID are described below.

Specific Example 1

In a specific example 1, only one unused AID is used to specify an RA-RU.

That is, the AID controller 103, 205 determines one unused AID for specifying the modified User Info. For example, the AID controller 103, 205 determines that AID=0 as the unused AID for specifying the modified User ID. That is the Trigger frame generator 104 sets AID=0 (unused AID) in the AID12 subfield thereby informing the terminal 200 that the User Info field including the AID12 subfield is in the modified User Info format.

Note that in the specific example 1, specifying of an RA-RU using the normal User Info is not performed. That is, in the specific example 1, any RA-RU is specified by the modified User Info.

For example, the Trigger frame generator 104 may set a plurality of modified User Info's to make it possible to set parameters individually for the respectively modified User Info's. That is, in the specific example 1, a small-size Trigger frame including a modified User Info is used. This makes it possible to achieve an operation similar to the operation of allocating an RA-RU by the normal User Info (that is, setting individually for each RU). Note that in the specific example 1, in RA transmission, the number of spatial multiplexing level is limited to 1 (no MIMO).

Specific examples 1-1 and 1-2 of the specific example 1 are described below for a case where the modified User Info is specified using one unused AID (AID=0).

Specific Example 1-1

In specific example 1-1, the Trigger frame generator 104 of the AP 100 sets one modified User Info in one Trigger frame.

Figure 10:
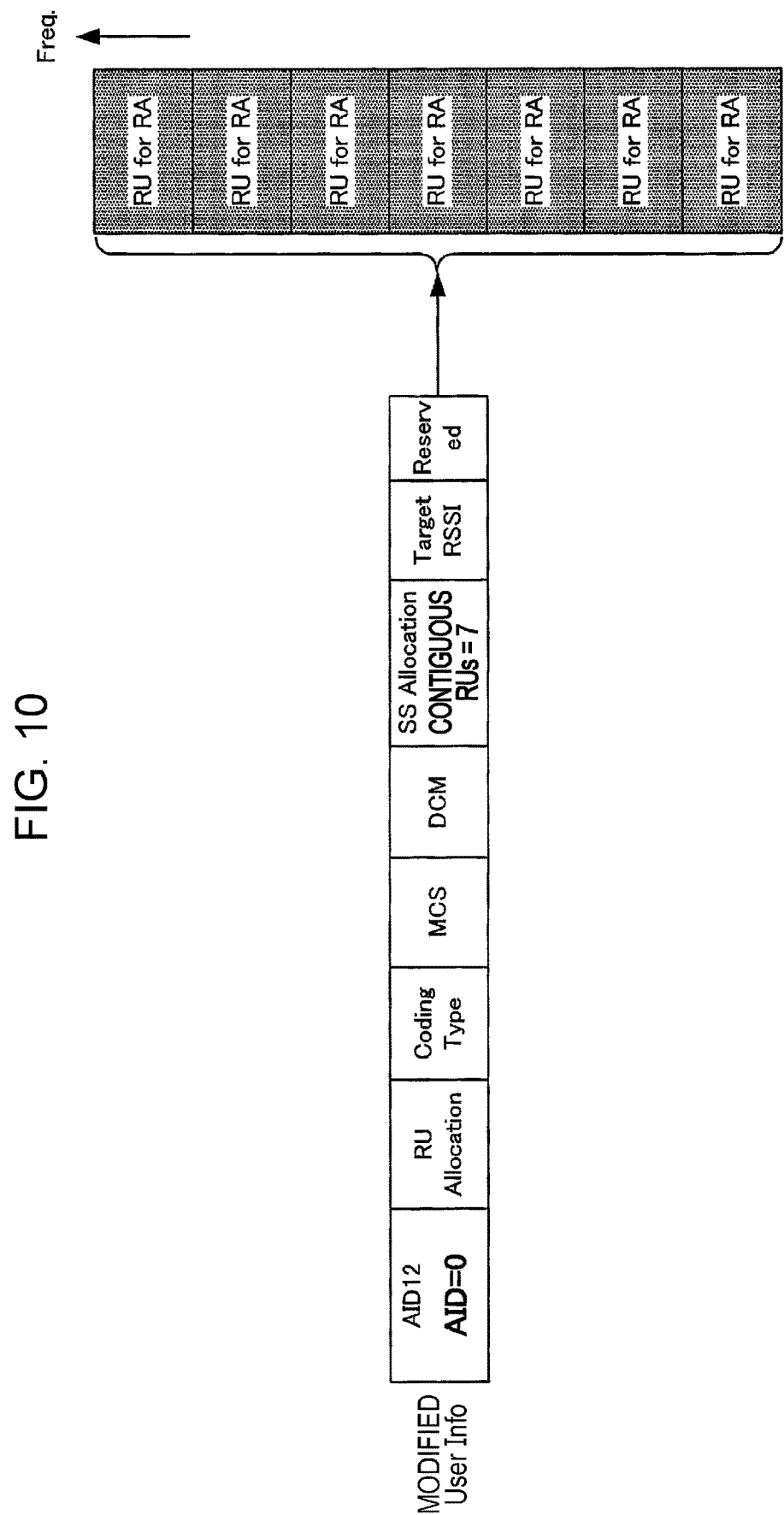
FIG. 10 is a diagram illustrating an example (a specific example 1-1) of an RA-RU specified by a modified User Info according to the first embodiment.

More specifically, as in an example shown in FIG. 10, the Trigger frame generator 104 sets an AID in an AID12 subfield of one modified User Info such that AID=0, which is an unused AID thereby informing the terminal 200 that the User Info field including this AID12 subfield is the modified User Info.

That is, the Trigger frame generator 104 sets a starting RU location and an RU size of a plurality of RA-RUs in the RU Allocation subfield shown in FIG. 10, and sets, in the SS allocation subfield, not the number of spatially multiplexed streams, but the number of contiguous RA-RUs. For example, in a case where a value taken in the SS allocation subfield is 0 to 63 (6 bits), it is allowed to notify, using the SS allocation subfield, of the number of contiguous RA-RUs in the range from 1 to 64. This makes it possible for the AP 100 to specify to the terminal 200 any one of contiguous RUs including 1 to 64 RUs by one modified User Info. In the example shown in FIG. 10, seven contiguous RA-RUs (contiguous RUs=7) are specified by one modified User Info.

In the specific example 1-1, as described above, all RA-RUs are specified using one modified User Info, and thus a reduction in the Trigger frame size is achieved.

Specific Example 1-2

In the specific example 1-2, the Trigger frame generator 104 of the AP 100 sets a plurality of modified User Info's using one Trigger frame.

Figure 11:
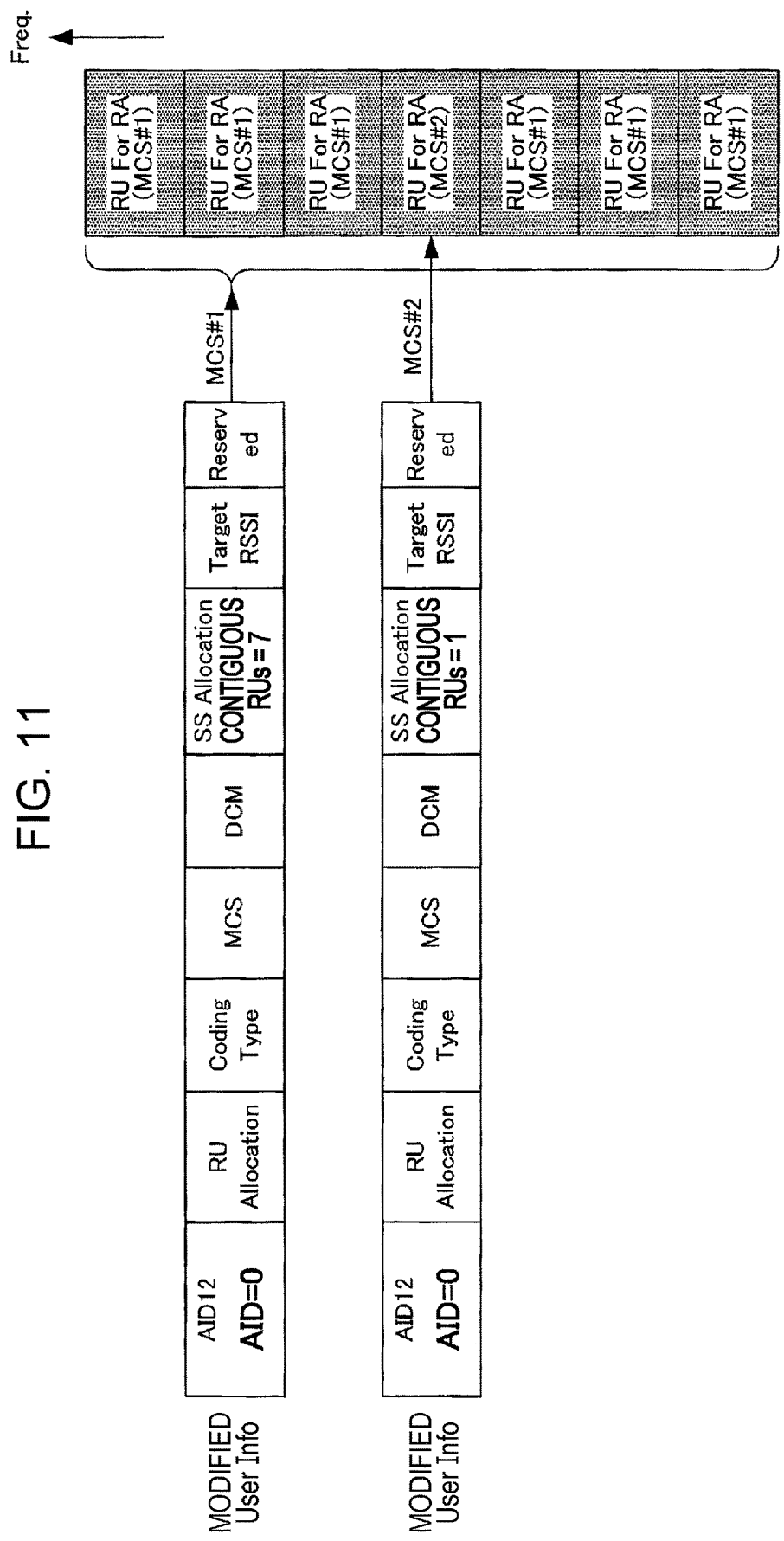
FIG. 11 is a diagram illustrating an example (a specific example 1-2) of an RA-RU specified by a modified User Info according to the first embodiment.

More specifically, as in an example shown in FIG. 11, the Trigger frame generator 104 generates a Trigger frame such that two modified User Info fields are included in one Trigger frame. As in the specific example 1-1, the Trigger frame generator 104 sets AID=0, which is an unused AIDs, in the AID12 subfield of each modified User Info field thereby informing the terminal 200 that each User Info field including this AID12 subfield is a modified User Info.

In FIG. 11, the AP 100 specifies seven contiguous RA-RUs in a first modified User Info and specifies MCS #1 (for example, 16QAM) for these RUs. Furthermore, the AP 100 specifies one RA-RU in a second modified User Info and specifies MCS #2 (for example, QPSK) for this RU.

In a case where there is overlapping in RA-RU among a plurality of modified User Info's as in the example shown in FIG. 11 (in the example shown in FIG. 11, an RU in the center of seven RA-RUs is overlapping), the RA resource determination unit 206 of the terminal 200 gives priority a modified User Info, of a plurality of modified User Info's, that specifies a smaller number of contiguous RUs. That is, in FIG. 11, priority is given to a modified User Info specifying one RA-RU (contiguous RUs=1) in the SS Allocation, and thus MCS #2 is used for the central RU.

This makes it possible to use a plurality of different parameters for a plurality of RA-RUs specified by one Trigger frame. Furthermore, by setting the number of contiguous RUs specified by the modified User Info to 1, it becomes possible to specify a parameter individually for each RU. For example, in FIG. 11, to the central RU of seven contiguous RA-RUs, a parameter (MCS) different from those to the other RUs is set. That is, in FIG. 11, of seven contiguous RA-RUs, the same parameter (MCS) is set to six RUs forming discontinuous bands other than the central RU.

For example, by setting a plurality of modified User Info's in one Trigger frame, it becomes possible for the AP 100 to set a robust MCS (for example, QPSK) to an RU (for example an RU located close to DC) of a plurality of contiguous RA-RUs such as those shown in FIG. 11.

In the specific example 1-2, as described above, it is possible to specify a parameter (MCS, target RSSI, or the like) individually to each RA for RA in a similar manner to the manner by the normal User Info except that the spatial multiplexing is limited to spatial multiplexing level=1 (no MIMO) for all RA-RUs.

Thus, according to the specific example 1-2, even in a case where the modified User Info is used, it is possible to specify a parameter individually to each RU, which makes it possible to use a parameter depending on a predicted performance for each RU, and thus an increase in throughput can be achieved.

Furthermore, in the specific example 1-2, by defining a rule regarding priority applied when there is an overlap among RUs specified by a plurality of modified User Info's, the AP 100 is capable of specifying a parameter depending on the predicted performance of the RU by a Trigger frame with a small size (with a small number of User Info fields).

Note that a method of allocating RA-RUs by a plurality of modified User Info's included in one Trigger frame is not limited to that shown in the example of FIG. 11.

Figure 12:
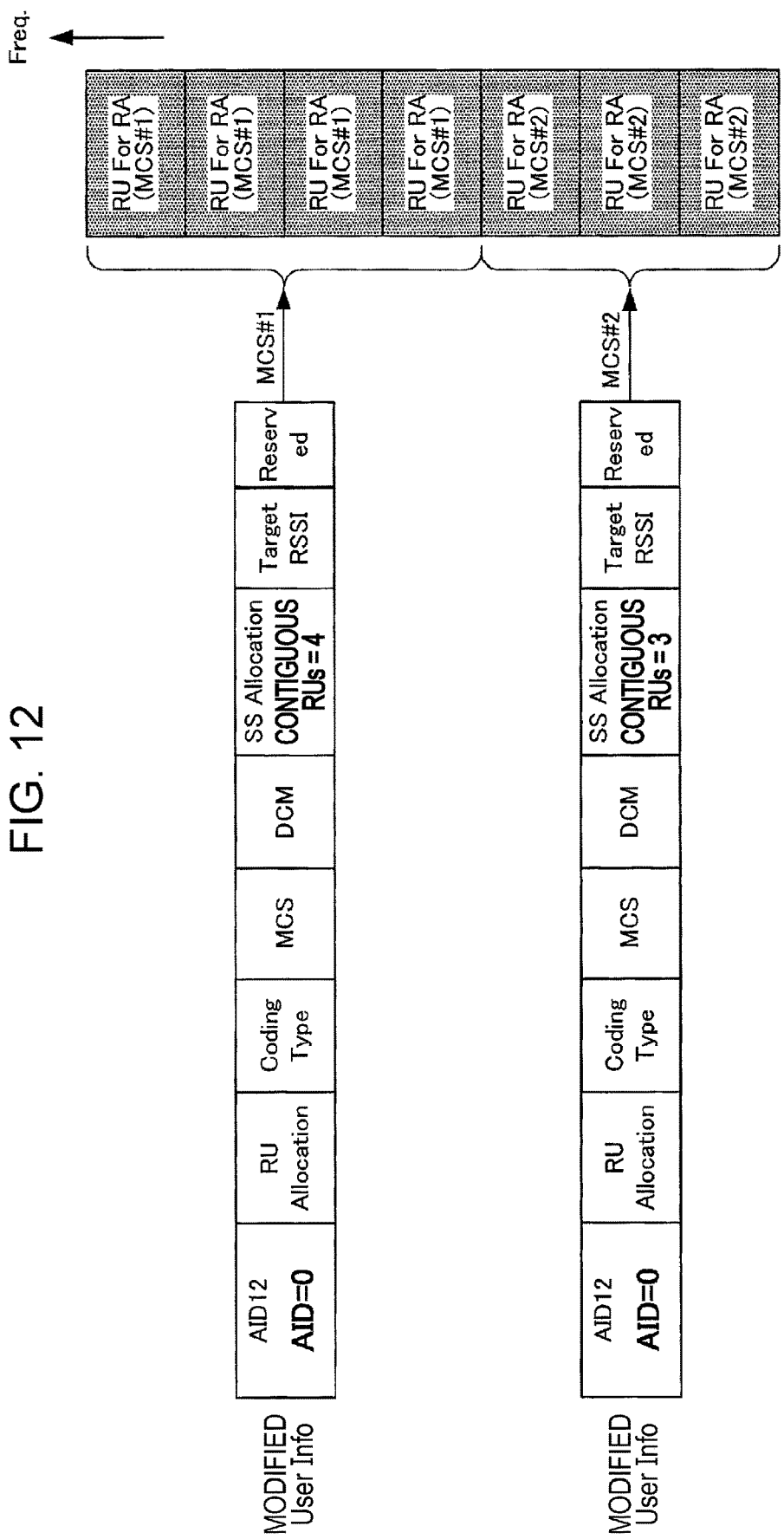
FIG. 12 is a diagram illustrating an example (a specific example 1-2) of an RA-RU specified by a modified User Info according to the first embodiment.

For example, as shown in FIG. 12, the AP 100 may specify RUs by two modified User Info's included in one Trigger frame such that there is no overlap between the two modified User Info's. In FIG. 12, the AP 100 specifies four RA-RUs by a first modified User Info and specifies MCS #1 (for example, 16QAM) for these RUs, and the AP 100 specifies, by a second modified User Info, three RA-RUs in an area adjacent to the four RA-RUs specified by the first modified User Info (that is, such that there is no overlap in the area), and specifies MCS #2 (for example, QPSK) for these RUs.

Figure 13:
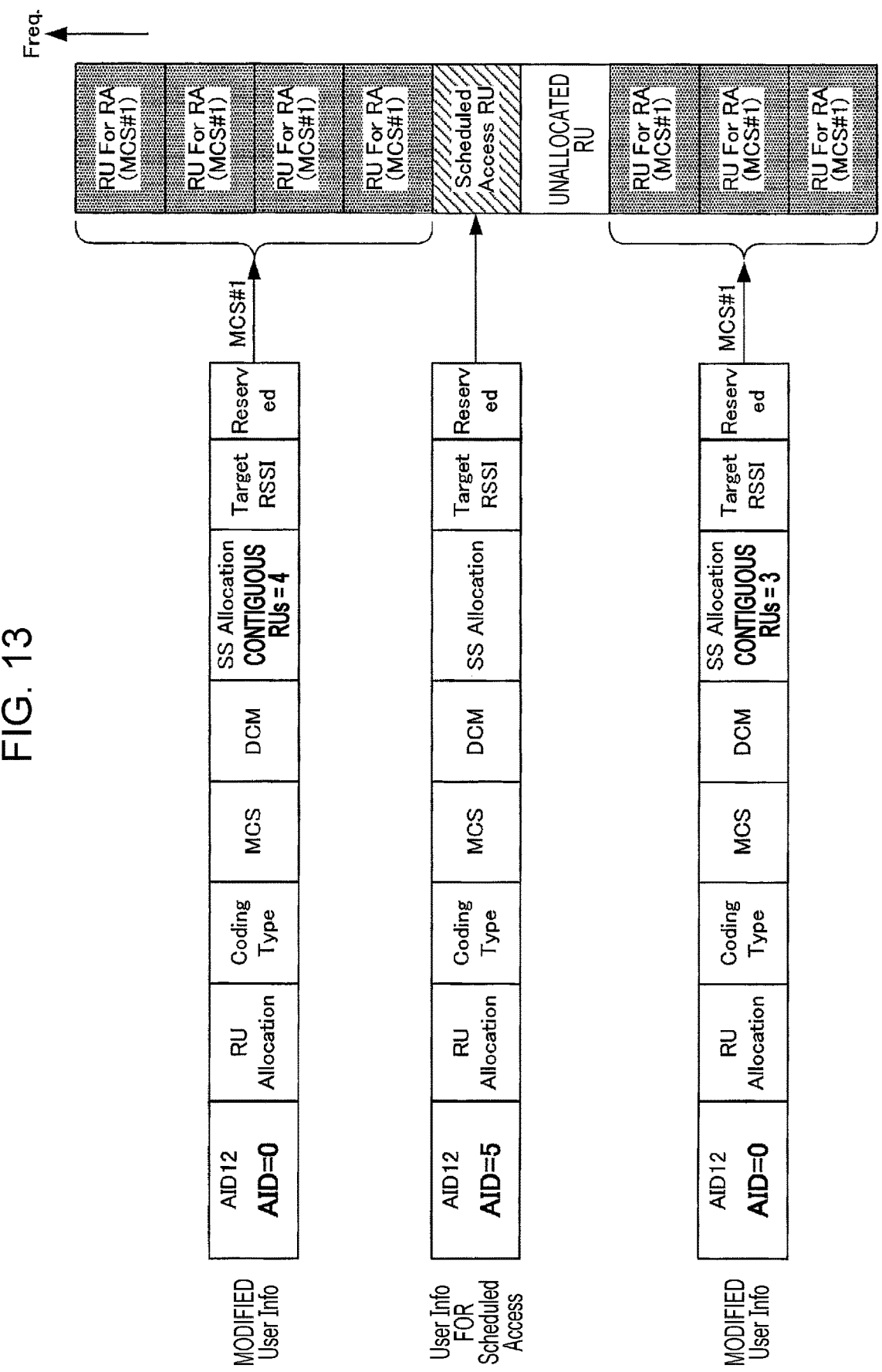
FIG. 13 is a diagram illustrating an example (a specific example 1-2) of an RA-RU specified by a User Info according to the first embodiment.

As shown in FIG. 13, the AP 100 may specify RUs by two modified User Info's included in one Trigger frame such that RUs specified by the respective modified User Info's are located in areas separated from each other. In FIG. 13, the AP 100 specifies four RA-RUs by a first modified User Info and three RA-RUs by a second modified User Info such that the three RA-RUs are in an area separated from the four RAs for RA specified by the first modified User Info's (and thus there is no overlap).

Although in FIG. 13, MCS #1 is applied to RUs specified by any modified User Info, a different parameter may be specified individually by each modified User Info. That is, an identical parameter in terms of MCS or like may be set for a plurality of modified User Info's or a different parameter may be set individually for each modified User Info, as in FIG. 12. Furthermore, as shown in FIG. 13, there may an arbitrary RU such as a Scheduled access RU or an unspecified RU (unallocated RU) between the two areas specified by the respective two modified User Info's. Note that in a case where parameters in terms of Coding Type, MCS, and DCM are set in common for all RUs specified by a plurality of User Info's, a reduction occurs in a degree of flexibility in making setting depending on a transmission characteristic or the like of each RU. However, in OFDMA-based random access, when a terminal obtains a transmission right, one RU is randomly selected from all RA-RUsndom access. Therefore, if there is a difference in the amount of data that can be transmitted by an RU among RUs specified in a plurality of modified User Info's, it is necessary to determine the amount of data of a transmission frame after the terminal selects an RU, which results in an increase in complexity of the transmission frame generation process. However, in the case where a common parameter is used for a plurality of modified User Info's, the amount of data capable of being transmitted is equal for all RA-RUsndom access, which allows simplification in the transmission frame generation process performed at a terminal.

In examples described above with reference to FIGS. 11 to 13, it is assumed by way of example, that two modified User Info's are included in one Trigger frame. However, three or more modified User Info's may be included in one Trigger frame.

Specific Example 2

In specific example 2, a plurality of unused AIDs are used to specify RA-RUs.

That is, the AID controller 103, 205 determines a plurality of unused AIDs for specifying User Info's (a modified User Info or a normal User Info) indicating RA-RUs.

The AID controller 103, 205 determines User Info's specifying RA-RUs while distinguishing between an unused AID corresponding to a normal User Info and an unused AID corresponding to a modified User Info. For example, the AID controller 103, 205 determines AID=0 as an unused AID for specifying a normal User Info and AID=2048 as an unused AID for identifying a modified User Info.

That is, the Trigger frame generator 104 sets AID=0 in the AID12 subfield thereby informing the terminal 200 that the User Info field including the AID12 subfield is in the normal User Info format, and specifies one RA-RU. Furthermore, the Trigger frame generator 104 sets AID=2048 (an unused AID different from AID=0) in the AID12 subfield thereby informing the terminal 200 that the User Info field including the AID12 subfield is in the modified User Info format, and specifies a plurality of RA-RUs (contiguous RA-RUs).

AID=2048 corresponds to a value that is set in the 12-bit AID12 subfield such that only the MSB (most significant bit) is 1 and the other lower-order 11 bits are all 0. Thus, in a case where the AID is set such that AID=0 or 2048 as described above, the terminal 200 determines that the User Info for RA is specified when lower-order 11 bits are all equal to 0. That is, it is possible to determine whether a modified User Info or a normal User Info is specified only from the MSB, and thus simplification of the process performed by the terminal 200 is achieved.

Figure 14:
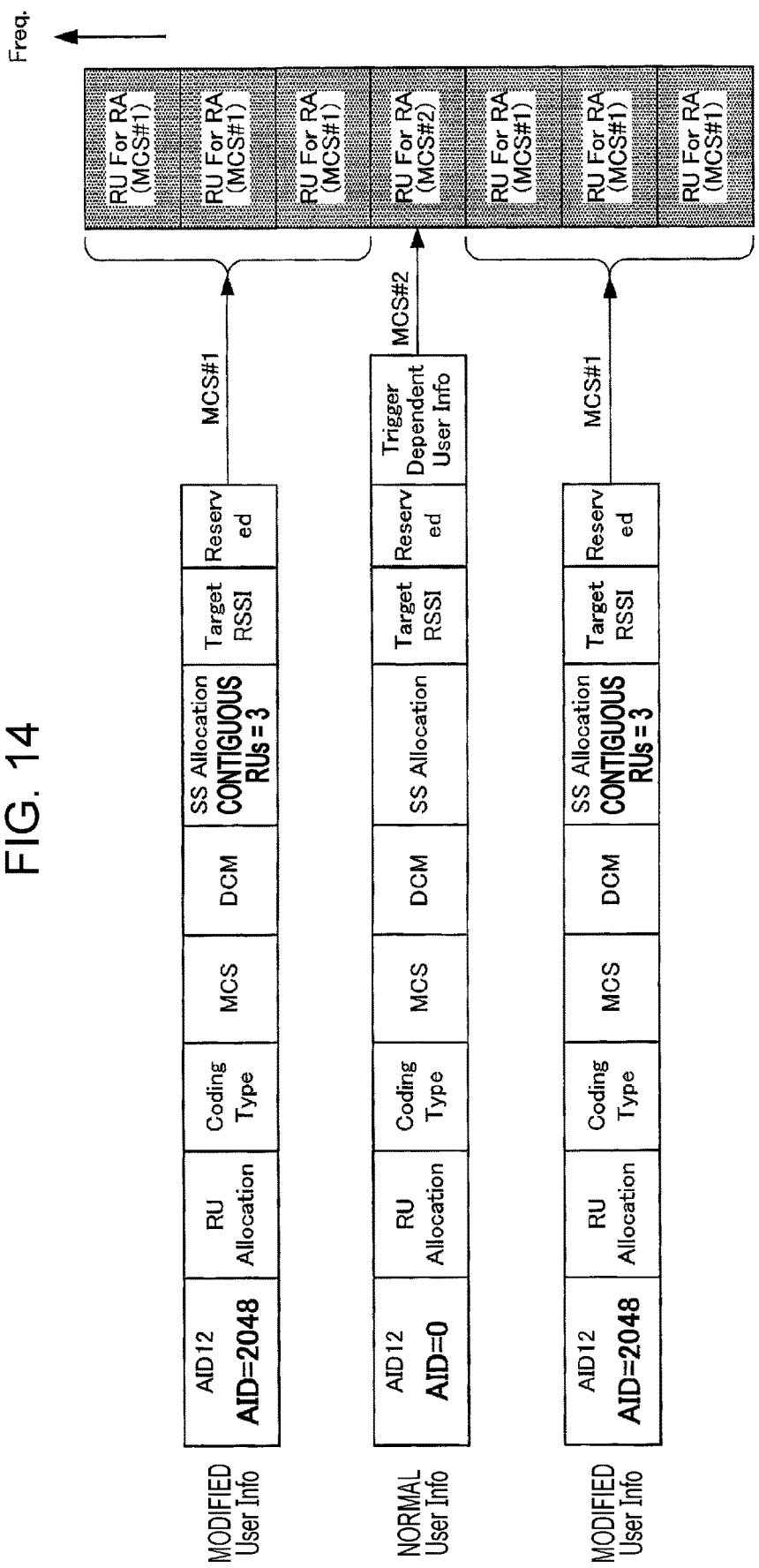
FIG. 14 is a diagram illustrating an example (a specific example 2) of an RA-RU specified by a User Info according to the first embodiment.

In the example shown in FIG. 14, the Trigger frame generator 104 of the AP 100 sets a plurality of unused AIDs (AID=0, 2048) such that AID=0 is set in the AID12 subfield of a normal User Info, and AID=2048 is set in the AID12 subfield of each modified User Info. Furthermore, in FIG. 14, the AP 100 specifies three RA-RUs (contiguous RUs=3) by each of two modified User Info's and specifies MCS #1 (for example, 16QAM) for each of these RUs. The AP 100 also specifies one RA-RU by one normal User Info and specifies MCS #2 (for example, QPSK) for this RU.

This makes it possible to use a plurality of different parameters distinctively for a plurality of RA-RUs specified in one Trigger frame. It is also possible to specify a parameter individually for each RU by making setting such that the number of contiguous RUs=1 specified by the modified User Info or a parameter is specified individually for each RU when the normal User Info is used. For example, in FIG. 14, a central RU in seven contiguous RA-RUs is set with a parameter (MCS) different from parameters set in the other RUs. That is, in FIG. 14, of seven contiguous RA-RUs, six RUs other than a central RU form a discontinuous band, and the same parameter (MCS) is set to these six RUs.

For example, the AP 100 is capable of setting a high-error-resilience robust MCS individually to a part of RUs (for example, a central RU) predicted to encounter degradation in performance by using a normal User Info or a modified User Info in which the number of contiguous RUs is set to 1.

According to the specific example 2, as described above, it is possible to apply a parameter depending on predicted performance for each RU by combining a normal User Info and a modified User Info thereby achieving an increase in throughput. Furthermore, according to the specific example 2, the AP 100 is also capable of specifying contiguous RA-RUs using a modified User Info as in the specific example 1 thereby reducing the Trigger frame size. Furthermore, in the specific example 2, it is also possible to set the number of spatially multiplexed streams in the SS allocation subfield (that is, it is possible to use MIMO) using a normal User Info.

Note that in FIG. 14, by way of example, AID=0 is set in the normal User Info and AID=2048 is set in the modified User Info's. However, values of unused AIDs set in the normal User Info and the modified User Info are not limited to 0 and 2048, and another value may be set.

Figure 15:
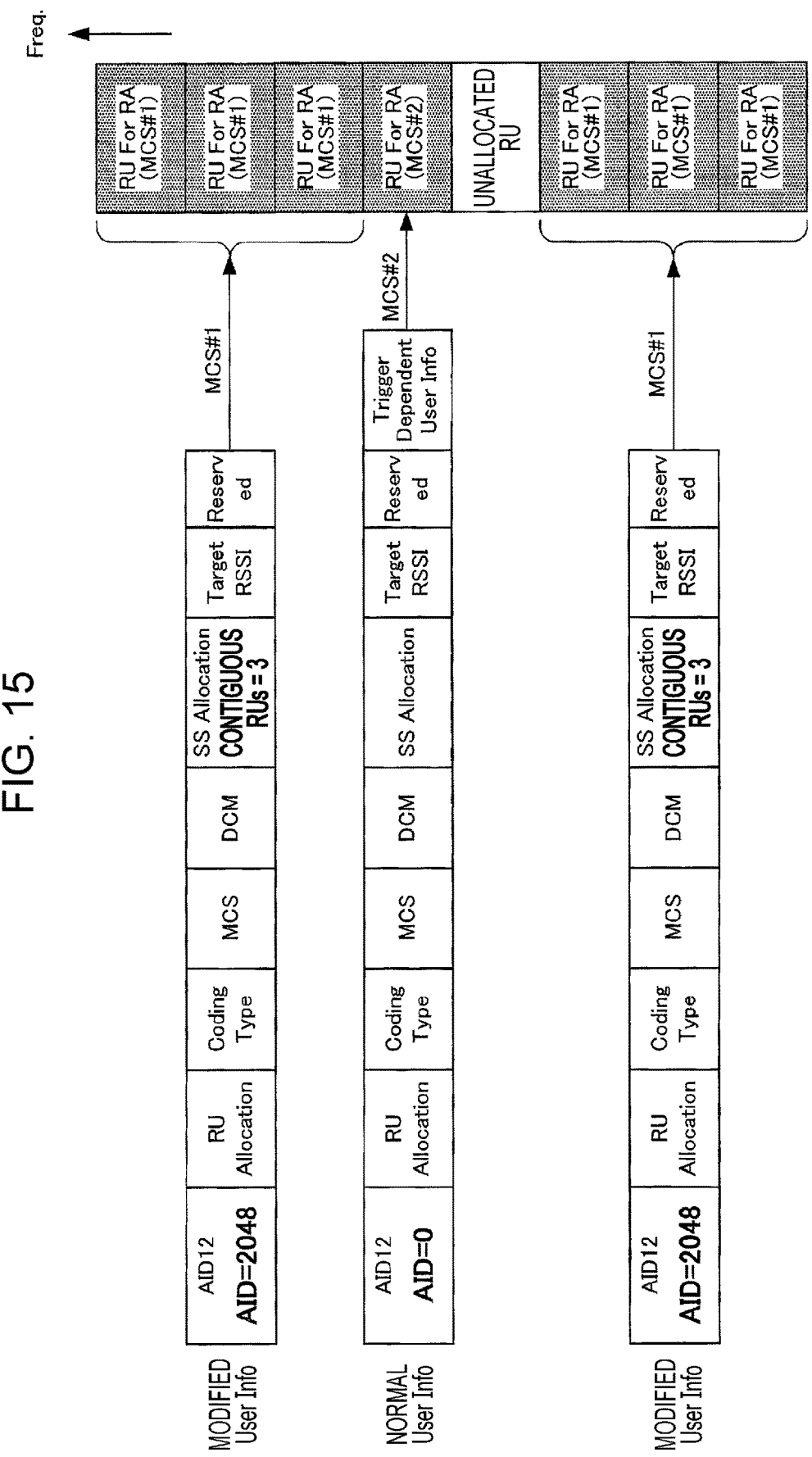
FIG. 15 is a diagram illustrating an example (a specific example 2) of an RA-RU specified by a User Info according to the first embodiment.

Furthermore, in the specific example 2, RA-RUs specified in one Trigger frame are not necessarily need to be contiguous as in the example shown in FIG. 14, but RUs located in discontinuous areas separated apart from each other may be specified, for example, as in an example shown in FIG. 15.

A specific example 2-1 and a specific example 2-2, which are further detailed examples of the specific example 2, of methods of specifying, using an unused ID, that the User Info field is the normal User Info or the modified User Info are described below.

Specific Example 2-1

In the specific example 2-1, the Trigger frame generator 104 of the AP 100 informs the terminal 200 of the RA-RU specified by the normal User Info (AID=0) and the contiguous RA-RUs specified by the modified User Info (an unused AID with a value of AID≠0).

Figure 16:
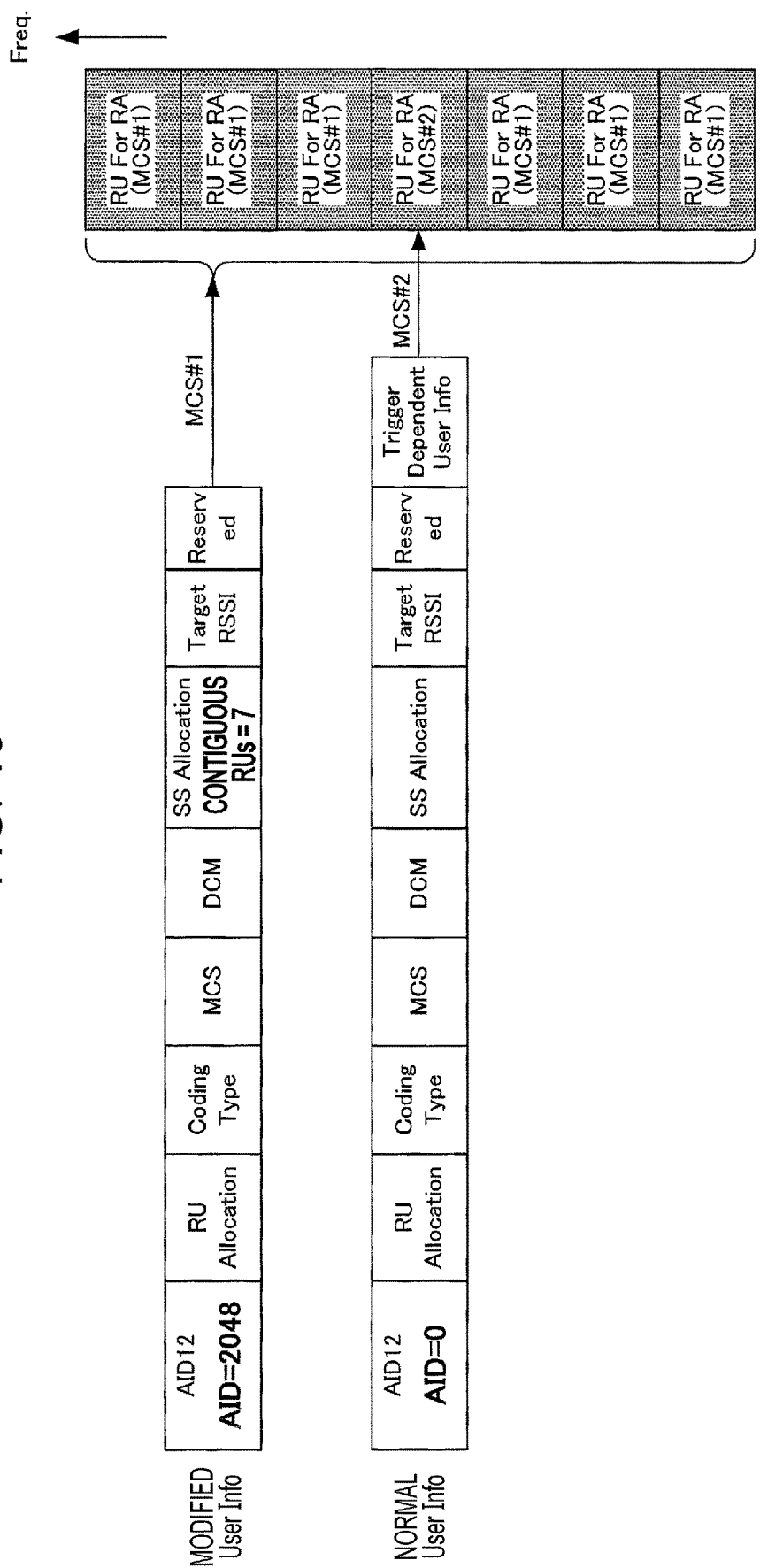
FIG. 16 is a diagram illustrating an example (a specific example 2-1) of an RA-RU specified by a User Info according to the first embodiment.

More specifically, as in an example shown in FIG. 16, the Trigger frame generator 104 specifies seven RA-RUs (contiguous RUs=7) using a modified User Info (AID=2048) and specifies MCS #1 (for example, 16QAM) for these RUs. Furthermore, the Trigger frame generator 104 specifies one RA-RU using a normal User Info (AID=0) and specifies MCS #2 (for example, QPSK) for this RU.

In a case where there is an overlap between one RA-RU specified by the normal User Info and contiguous RA-RUs specified by the modified User Info as shown in FIG. 16, (in FIG. 16, occurs at the central RU in seven RA-RUs), the RA resource determination unit 206 of the terminal 200 gives priority to the normal User Info specifying the RU. That is, in FIG. 16, as for the central RU, priority is given to the normal User Info, and thus MCS #2 is applied to the central RU.

Thus, in the specific example 2-1, as in the specific example 2 (FIG. 14), it is possible to use a plurality of parameters distinctively for RA-RUs specified in one Trigger frame. For example, as shown in FIG. 16, the AP 100 may setting a high-error-resilience robust MCS individually to a part of RUs (for example, a central RU) predicted to encounter degradation in performance by using a normal User Info.

In the specific example 2-1, by defining a rule indicating which RU is given priority in a case where there is an overlap between an RU specified by a normal User Info and an RU specified by a modified User Info, the AP 100 is capable of specifying a parameter depending on the predicted performance of the RU by a Trigger frame with a small size (with a small number of User Info fields). For example, in the specific example 2-1 (FIG. 16), it is possible to make similar setting of RA-RUs to the setting in the specific example 2 (FIG. 14) by using a Trigger frame with a smaller size (with a smaller number of User Info fields).

Specific Example 2-2

In the specific example 2-2, each of a plurality of unused AIDs is associated with a restriction condition (a terminal restriction condition) imposed on the terminal 200 that transmits an RA signal. That is, the AP 100 specifies, using a plurality of unused AIDs, a terminal restriction condition imposed on the terminal 200 that transmits an RA signal.

Figure 17:
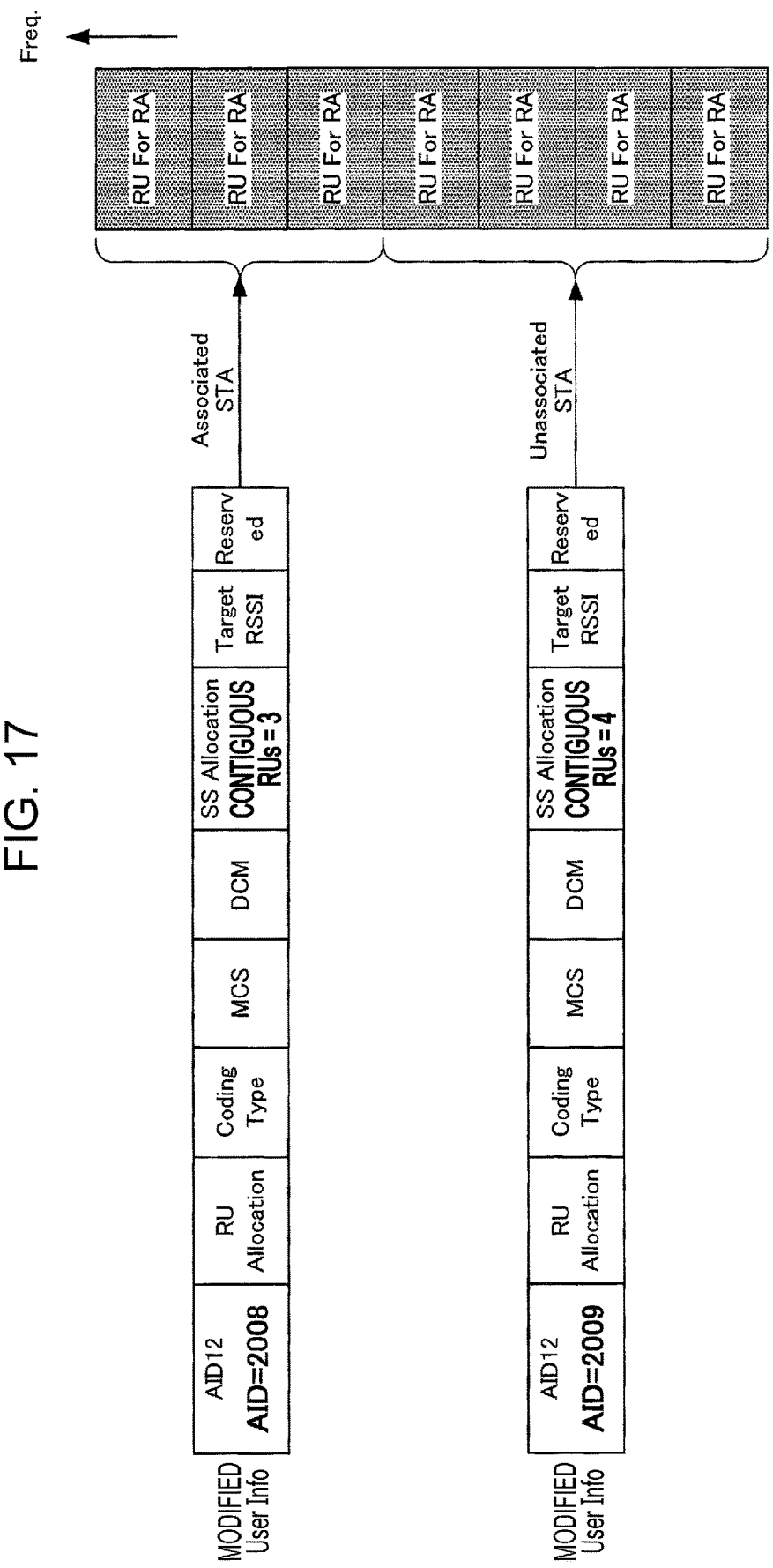
FIG. 17 is a diagram illustrating an example (a specific example 2-2) of an RA-RU specified by a modified User Info according to the first embodiment.

As in an example shown in FIG. 17, the AID controller 103, 205 determines AID=2008 and AID=2009 as unused AIDs corresponding to modified User Info's specifying RA-RUs. Furthermore, the AID controller 103, 205 assigns different terminal restriction conditions to AID=2008 and AID=2009 respectively. The Trigger frame generator 104 of the AP 100 sets AID=2008 or 2009 in AID12 subfields thereby informing the terminal 200 that the User Info fields including the AID12 subfield are both in the modified User Info format.

In FIG. 17, the AP 100 specifies connection conditions of the terminal 200 as the terminal restriction conditions different between respective unused AIDs specifying a modified User Info. More specifically, as shown in FIG. 17, an RA-RU specified by AID=2008 is an RA-RU limited for use between the AP 100 and a terminal 200 (Associated STA) connected to the AP 100. An RA-RU specified by AID=2009 is an RA-RU limited for use between the AP 100 and an unconnected terminal 200 (Unassociated STA).

Thus, it is possible to classify terminals 200 transmitting an RA signal using each RU into Associated STAs and Unassociated STAs. Therefore, the AP 100 sets an appropriate parameter individually for each connection condition of a terminal 200.

For example, the AP 100 already has information regarding an Associated STA (in terms of a communication condition of a terminal 200), and thus the AP 100 is capable of properly adjusting an uplink parameter (power, MCS, or the like) for the Associated STA. In contrast, the AP 100 does not have information regarding an Unassociated STA, and thus the AP 100 sets a high-error-resilience robust value as an uplink parameter for the Unassociated STA. Thus, as shown in FIG. 17, the AP 100 sets RA-RUs separately for the Associated STA and the Unassociated STA, and performs scheduling such that OFDMA-multiplexing does not occur in the same packet thereby making it possible to achieve, for example, a reduction in interference between terminals 200 for which different parameters (for example, transmission power) are set. Furthermore, the AP 100 may set an MCS with higher error resilience to an Unassociated STA thereby preventing degradation in performance.

In an alternative example, the AP 100 may specify a transmission power condition of a terminal 200 as a terminal restriction condition that is different for each unused AID indicating a modified User Info (not illustrated in figures). More specifically, an RA-RU specified by AID=2008 is an RA-RU limited for use by a terminal 200 which has an available minimum power that is equal to or smaller than a required uplink transmission power, that is, which is capable of performing transmission with the required uplink transmission power. An RA-RU specified by AID=2009 is an RA-RU limited for use by a terminal 200 which has an available minimum power greater than a required uplink transmission power, that is, which is not capable of performing transmission with required uplink transmission power.

Thus, the AP 100 may performing scheduling such that OFDMA-multiplexing is not performed in the same packet for a terminal 200 that is not capable of performing transmission with required uplink transmission power and a terminal 200 that is capable of performing transmission with required uplink transmission power thereby achieving a reduction in interference between the terminals 200. The AP 100 may set an MCS with higher error resilience to a terminal 200 that is not capable of performing transmission with required uplink transmission power thereby preventing degradation in performance.

In an alternative example, as a terminal restriction condition different for each unused AID specifying a modified User Info, the AP 100 may specify a transmission data restriction condition (not illustrated) imposed on a terminal 200. More specifically AID=2008 may specify a modified User Info including Trigger Dependent user Info information in a User Info field, while AID=2009 may specify a modified User Info including no Trigger Dependent user Info information in a User Info field.

In a case where a User Info field includes Trigger Dependent user Info information (that is, in a case where an A-MPDU (Aggregate MAC protocol data unit), which is a combination of a plurality of MPDUs, is used), it is predicted that a processing time of a process performed by the AP 100 is longer than in a case where there is no Trigger Dependent user Info information. In view of the above, for example, the AP 100 may perform scheduling such that an RU used by a terminal 200 is selected depending on the processing time for an uplink signal that is transmitted in response to an instruction by a Trigger frame thereby achieving an increase in RU usage efficiency.

Note that the terminal restriction conditions are not limited to the connection condition of the terminal 200, the transmission power condition, and the transmission data restriction condition described above.

According to the specific example 2-2, as described above, by providing an instruction in which a plurality of unused AIDs are associated with restriction conditions imposed on the terminal 200, the AP 100 is capable of properly performing scheduling of RA-RUs depending on a state of the terminal 200.

Figure 18:
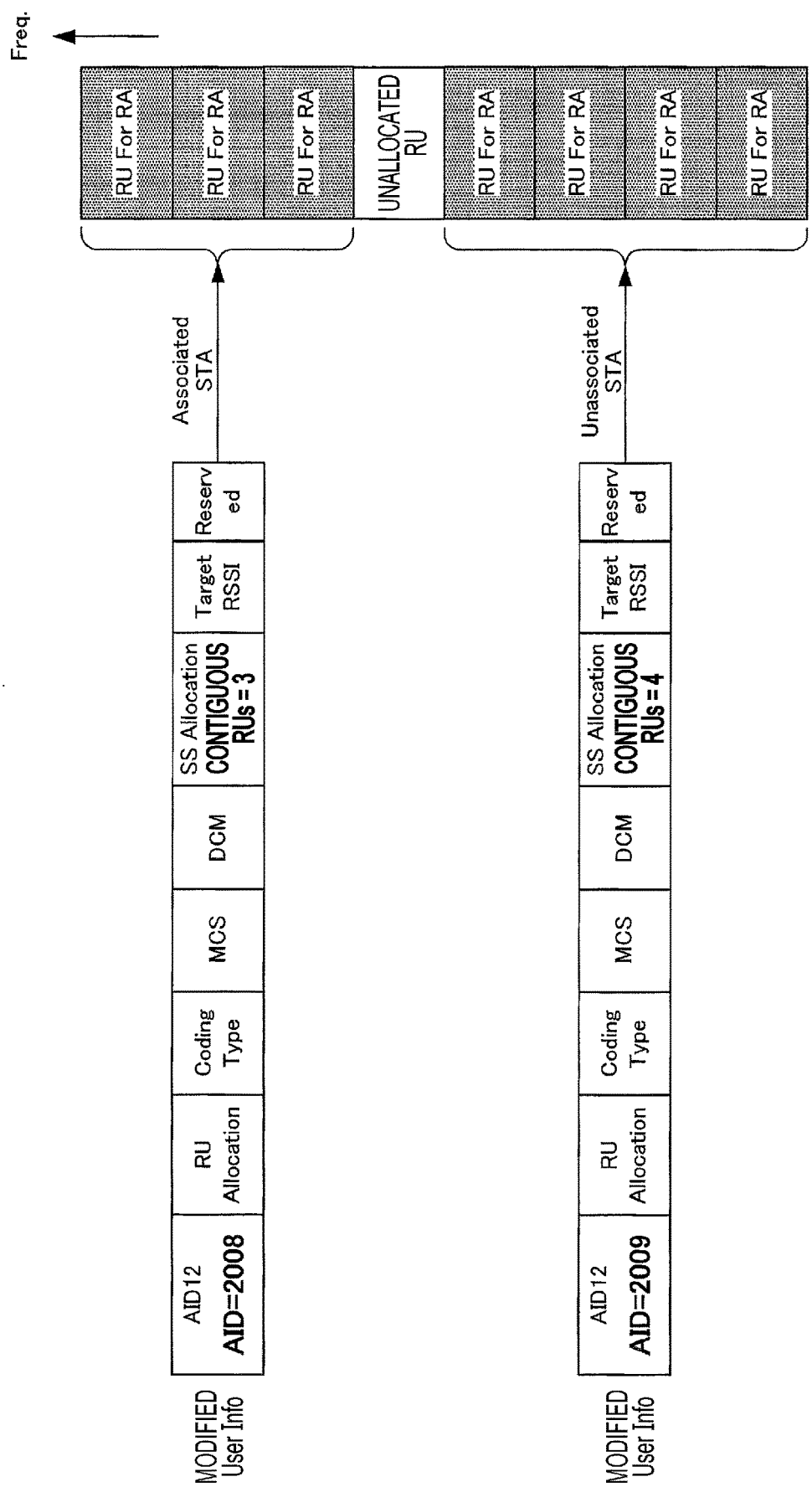
FIG. 18 is a diagram illustrating an example (a specific example 2-2) of an RA-RU specified by a modified User Info according to the first embodiment.

Note that in the specific example 2-2, RA-RUs specified by one Trigger frame are not limited to contiguous RUs such as those shown in FIG. 17. For example, RUs located in discontinuous areas separated from each other may be specified as shown in FIG. 18.

The specific examples 1 and 2 of methods of specifying a format of a User Info field using an unused AID have been described above.

In the above-described examples, the parameter specified by the modified User Info is, by way of example, the MCS. However, other parameters (Coding Type, DCM, Target RSSI) may also specified in a similar manner to the MCS.

Advantageous Effects

According to the present embodiment, as described above, the Trigger frame generator 104 of the AP 100 sets an unused AID, which is not to be used in Scheduled access, in a modified User Info specifying one or more contiguous resource units for random access in a Trigger frame. This makes it possible for a terminal 200 to make a determination, based on a value of an AID indicated in an AID12 subfield of each User Info field of the Trigger frame, as to whether the User Info field is a modified User Info or not.

According to the present embodiment, therefore, it is not necessary to use (consume) a Reserved area of a Trigger type to specify a modified User Info. That is, it is possible to specify a modified User Info while leaving room for future extension of the standard. Thus, according to the present embodiment, it is possible to properly set a modified User Info in a Trigger frame.

Furthermore, according to the present embodiment, by setting a plurality of modified User Info's (or a normal User Info and at least one modified User Info) in one Trigger frame, it becomes possible to allocate not only contiguous RUs but uncontiguous RUs, and it also becomes possible to specify different parameters for the respective User Info's. This makes it possible to specify a parameter depending on a predicted performance for each of a plurality of RA-RUs specified by a Trigger frame, thereby achieving an increase in throughput.

Second Embodiment

For example, in a case where a modified User Info is set as described above with reference to FIG. 6A or other figures, it is under discussion to reduce the Trigger frame size by deleting the Trigger Dependent Common Info subfield and the Trigger Dependent User Info subfield.

However, in a case where the Trigger Type is the Basic Trigger (see FIG. 3) (in a case where the Trigger frame instructs normal data transmission without imposing any restriction on the format of the uplink signal), it is useful not only in Scheduled access but also in RA transmission that a User Info field includes a Trigger Dependent User Info subfield thereby providing a notification of restriction information (a restriction on the number of combined MPDUs, a recommended AC, or the like) on uplink transmission data shown in FIG. 5.

In view of the above, a second embodiment provides a method of efficiently transmitting restriction information on uplink transmission data when a modified User Info is transmitted.

According to the present embodiment, a wireless communication system includes an AP (radio transmission apparatuses) 300 and a terminal (radio reception apparatus) 400. The AP 300 transmits a Trigger frame specifying an RA transmission to the terminal 400. The terminal 400 receives the Trigger frame and transmits RA to the AP 300 using a resource specified in the Trigger frame.

[Configuration of AP]

Figure 19:
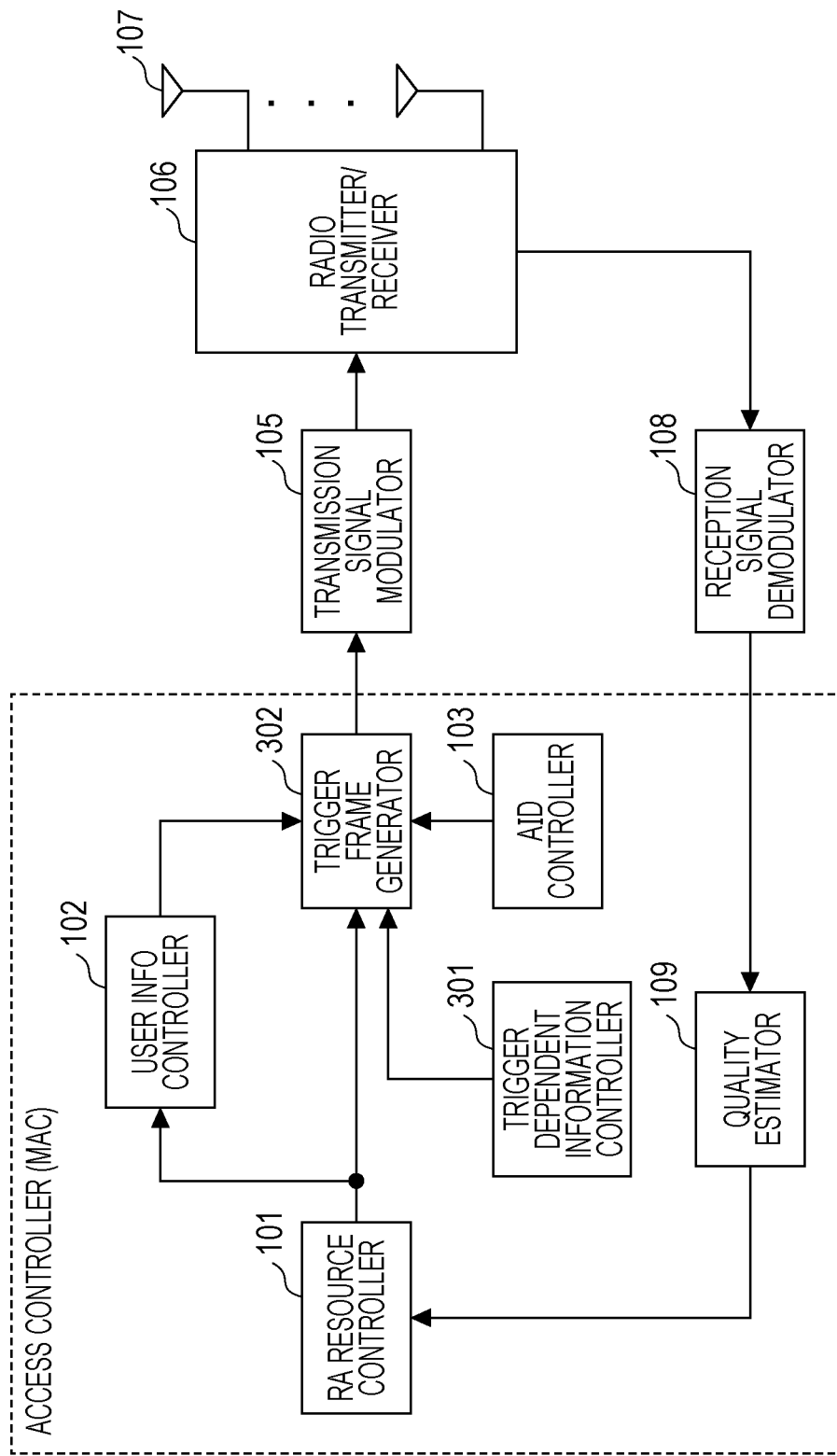
FIG. 19 is a block diagram illustrating an example of a configuration of an AP according to a second embodiment.

FIG. 19 is a block diagram illustrating a configuration of the AP 300 according to the present embodiment. In FIG. 19, similar blocks operating in a similar manner to blocks according to the first embodiment (FIG. 8) are denoted by similar reference symbols, and a description thereof is omitted. More specifically, the AP 300 is different from the AP 100 (FIG. 8) according to the first embodiment in that a Trigger dependent information controller 301 is additionally provided and the Trigger frame generator 302 operates in a different manner.

The Trigger dependent information controller 301 determines Trigger dependent information (Trigger Dependent Common Info or Trigger Dependent User Info) depending on Trigger Type, and outputs Trigger dependent information (restriction information on uplink transmission data) and information indicating a field and a subfield in which the Trigger dependent information is located to the Trigger frame generator 302.

The location of the Trigger dependent information in the Trigger frame is defined, for example, by specifications or the like, and the location is equally recognized by both a transmission apparatus and a reception apparatus (the AP 300 and the terminal 400). For example, in a case where the Trigger Type is the Basic Trigger and the format of User Info field is the modified User Info, restriction information on uplink transmission data is included as Trigger dependent information in a Trigger frame. A method of applying the Trigger dependent information to the terminal 400 will be described later.

The Trigger frame generator 302 performs, in addition to the operation performed by the Trigger frame generator 104 according to the first embodiment, an operation of setting Trigger dependent information in a predetermined field and subfield of the Trigger frame according to an instruction given by the Trigger dependent information controller 301.

[Configuration of Terminal]

Figure 20:
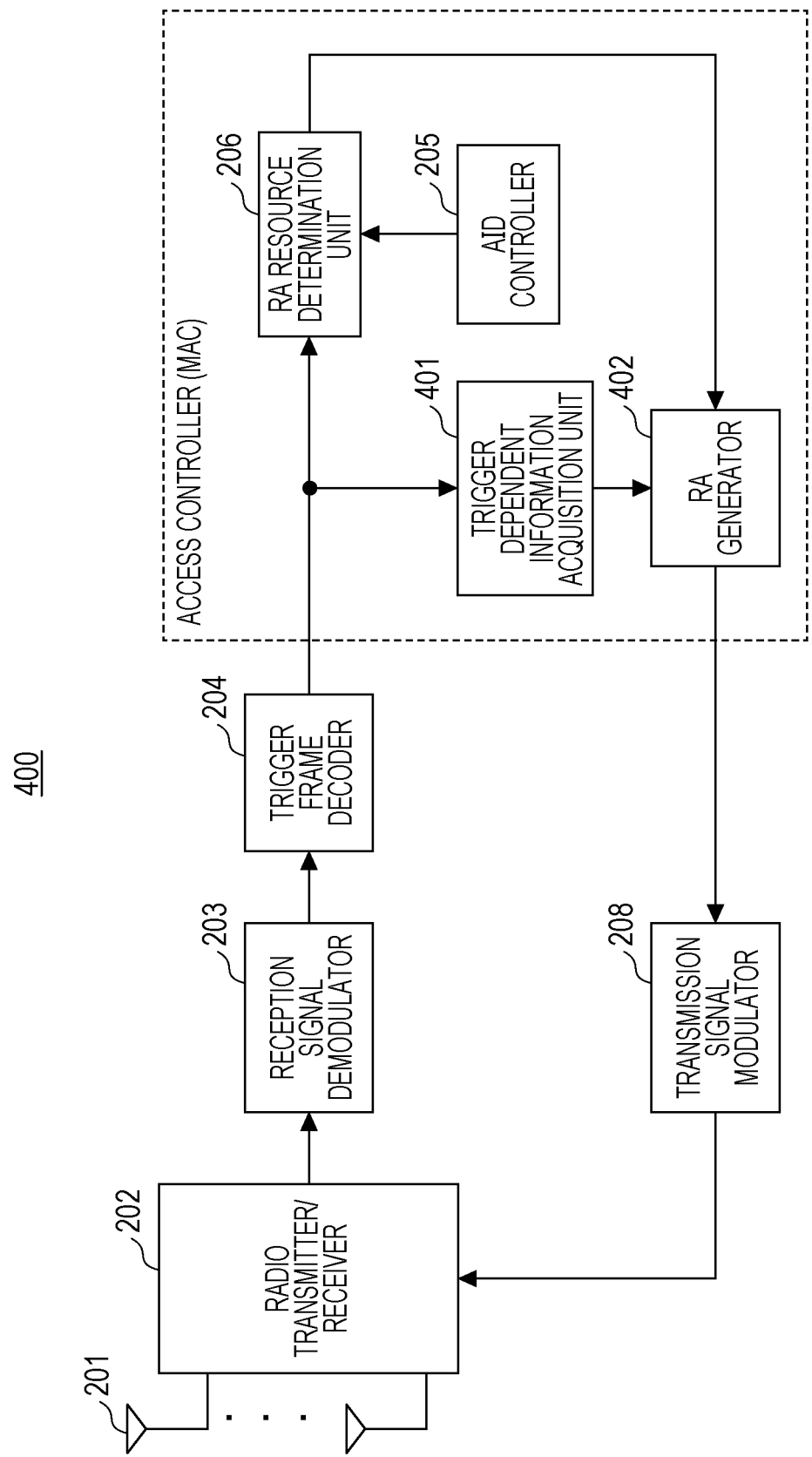
FIG. 20 is a block diagram illustrating an example of a configuration of a terminal according to the second embodiment.

FIG. 20 is a block diagram illustrating a configuration of the terminal 400 according to the present embodiment. In FIG. 20, similar blocks operating in a similar manner to blocks according to the first embodiment (FIG. 9) are denoted by similar reference symbols, and a description thereof is omitted. More specifically the terminal 400 is different from the terminal 200 (FIG. 9) according to the first embodiment in that a Trigger dependent information acquisition unit 401 is additionally provided and the RA generator 402 operates in a different manner.

The Trigger dependent information acquisition unit 401 acquires Trigger dependent information (Trigger Dependent Common Info or Trigger Dependent User Info) from the Trigger frame output from the Trigger frame decoder 204, and outputs the acquired Trigger dependent information to the RA generator 402.

Based on the RA-RU and control information for generating the RA signal determined by the RA resource determination unit 206 and the Trigger dependent information output from the Trigger dependent information acquisition unit 401, the RA generator 402 generates an RA signal including a terminal ID and transmission information (data, control information, or the like) associated with the terminal 400.

[Operations of AP 300 and Terminal 400]

Next, operations of the AP 300 and the terminal 400 according to the present embodiment are described.

In a case where the Trigger Type is the Basic Trigger, the AP 300 specifies restriction information on uplink transmission data as the Trigger dependent information even when the format of the User Info field is the modified User Info.

Specific examples 1 to 3 of methods of specifying restriction information on uplink transmission data in a Trigger frame including a modified User Info are described below.

Specific Example 1

As illustrated in FIG. 6A, in a Trigger frame in which a modified User Info does not include a Trigger Dependent User Info subfield, when the Trigger Type is the Basic Trigger, in order for the terminal 400 to detect the size of each User Info field in the Trigger frame (in order to detect a boundary between of each User Info field), it is necessary to decode an AID12 subfield of each User Info field, which results in an increase in complexity of a reception process performed by the terminal 400.

In view of the above, in the specific example 1, in a case where the Trigger Type is the Basic Trigger, the modified User Info is configured such that a Trigger Dependent User Info subfield is included also in the modified User Info, and restriction information on uplink data is set as Trigger dependent information.

That is, in a case where the Trigger Type of the Trigger frame is the Basic Trigger, the Trigger frame generator 302 of the AP 300 sets restriction information on uplink signal in transmission in the modified User Info.

Figure 21:
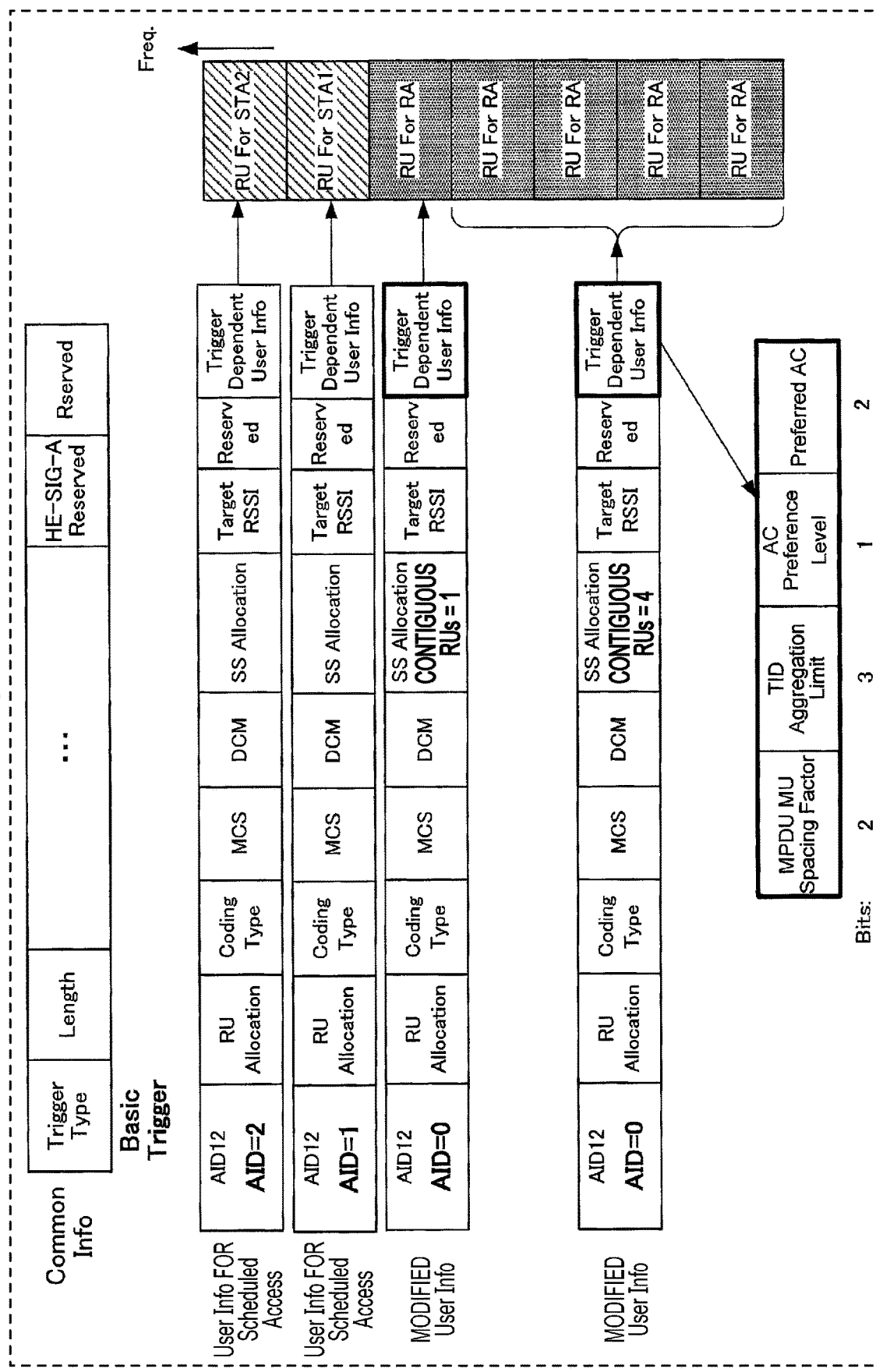
FIG. 21 is a diagram illustrating an example (a specific example 1) of an RA-RU specified by a User Info according to the second embodiment.

More specifically, in an example shown in FIG. 21, a Trigger frame includes a mixture of normal User Info's (AID=1 and 2) specifying RUs for Scheduled access and modified User Info's (AID=0) specifying a plurality of RA-RUs. Furthermore, in FIG. 21, Basic Trigger is specified in a Trigger Type subfield of a Common Info field.

In this case, in each normal User Info, restriction information on uplink transmission data specific for each terminal is set as Trigger Dependent User Info. On the other hand, in each modified User Info, only in a case where the Basic Trigger is set as the Trigger Type, restriction information on uplink transmission data to be applied to an RA-RU is set as Trigger Dependent User Info.

Thus, in a case where the Trigger Type included in Common Info of the Trigger frame is the Basic Trigger, it is possible to determine that all User Info fields have sizes (for example 5 bytes) including the Trigger Dependent User Info, that is, they have an equal size). That is, the terminal 400 does not need to decode an AID12 subfield of each User Info field to detect the User Info field size.

According to the specific example 1, as described above, the User Info field size is uniquely determined from the Trigger Type regardless of the User Info field format, and thus simplification of the reception process performed by the terminal 400 is achieved.

Furthermore, the AP 300 can notify of Trigger Dependent user Info information even in a modified User Info. Also in RA transmission by the terminal 400, restriction information on data transmission can be effectively used as in Scheduled access transmission.

Specific Example 2

In the specific example 2, in a case where the Trigger Type of the Trigger frame is the Basic Trigger, a restriction on uplink signal transmission is imposed on the terminal 400 which is instructed to use one or more contiguous RA-RUs specified by a modified User Info in the Trigger frame.

Figure 22:
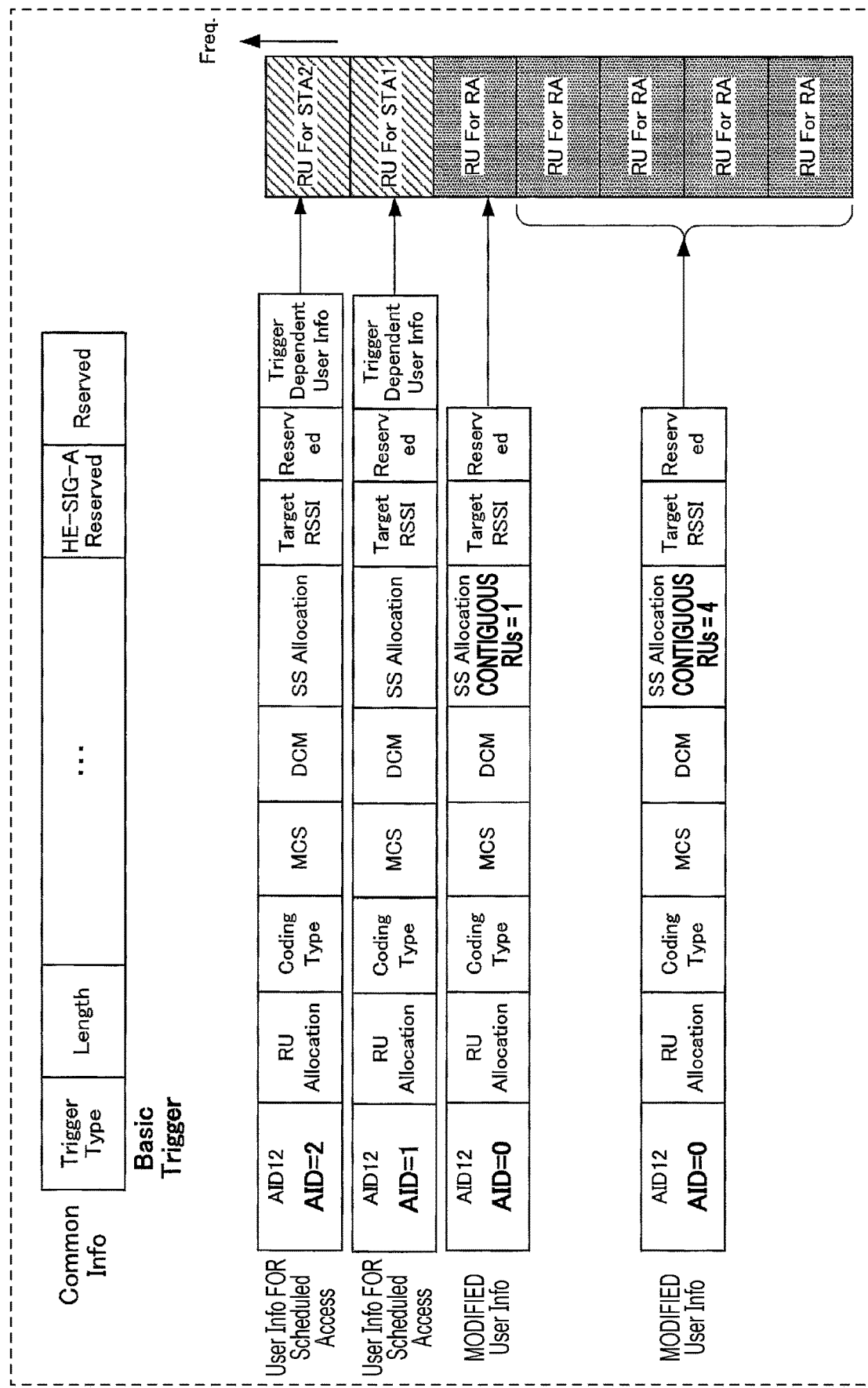
FIG. 22 is a diagram illustrating an example (a specific example 2) of an RA-RU specified by a User Info according to the second embodiment.

That is, in the specific example 2, as in an example shown in FIG. 22, in a case where the Trigger Type is the Basic Trigger, unlike the specific example 1 (FIG. 21), any modified User Info does not include a Trigger Dependent User Info subfield.

As for a fixed restriction imposed on uplink data transmitted by the terminal 400, for example, an MPDU MU Spacing Factor and a TID Aggregation Limit may be limited to fixed values (a single MPDU with a small size) assuming that the number of MPDUs=1. This makes it possible to prevent the AP 300 from having a delay in response time. Note that the fixed restriction on the uplink data transmitted by the terminal 400 is not limited to the fixed value assuming that the number of MPDUs=1, but other values may be employed.

Thus, in the specific example 2, when the Trigger Type is the Basic Trigger, by specifying a plurality of RA-RUs using a modified User Info as in the first embodiment, it is possible to apply the restriction on the RA transmission using RA-RUs specified by the modified User Info while reducing the Trigger Frame size.

Specific Example 3

Figure 23:
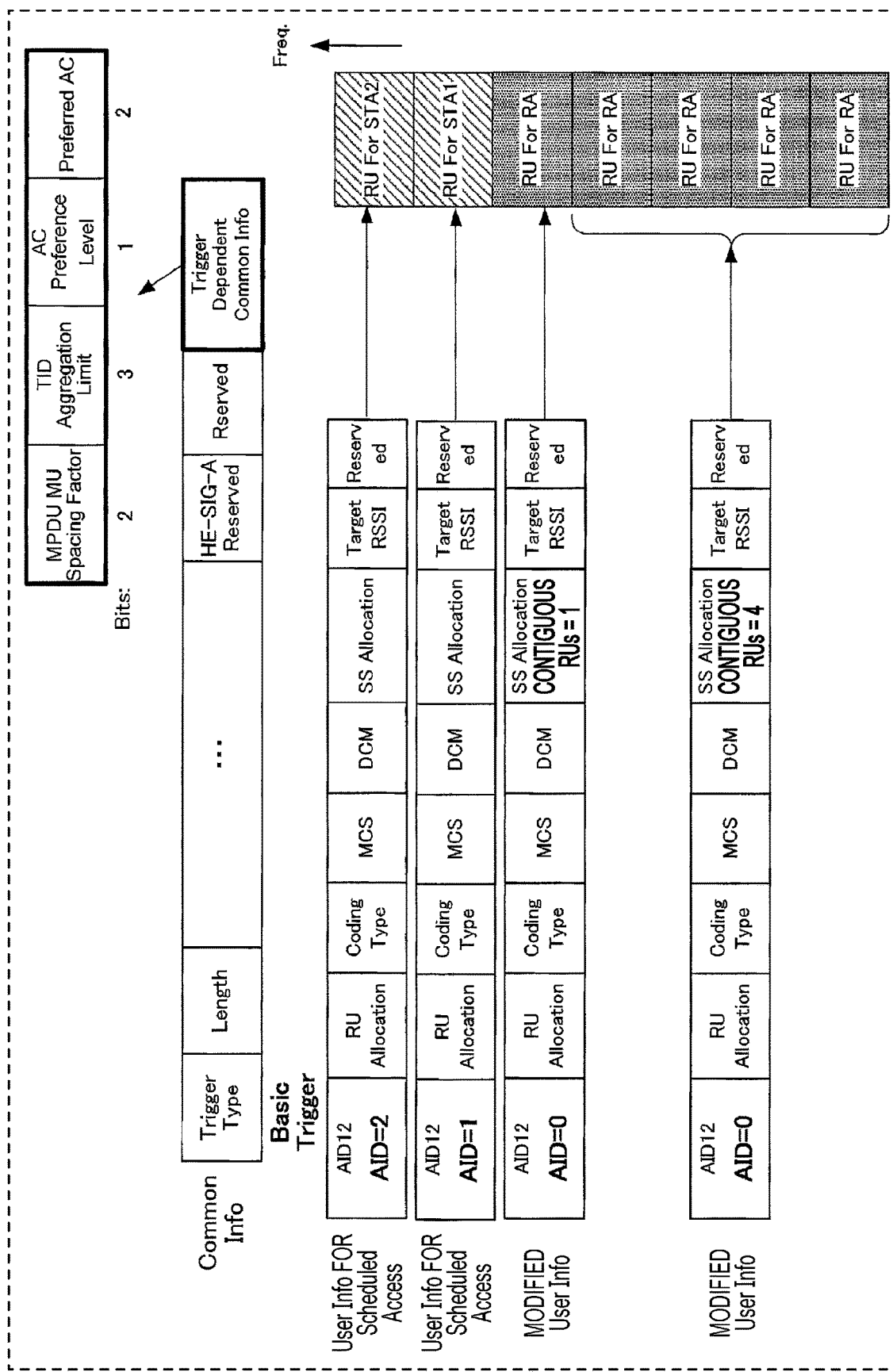
FIG. 23 is a diagram illustrating an example (a specific example 3) of an RA-RU specified by a User Info according to the second embodiment.

In the specific example 3, in a case where the Trigger Type is the Basic Trigger, as shown in FIG. 23, a Common Info includes a Trigger Dependent Common Info subfield, and restriction information on data transmission is set by a parameter which is common for all OFDM-multiplexed terminals 400.

That is, in a case where the Trigger Type of the Trigger frame is the Basic Trigger, the Trigger frame generator 302 of the AP 300 sets restriction information on the uplink signal transmission in the Common Info.

That is, in the specific example 3, in the User Info field, the restriction information on uplink signal in transmission is not set regardless of the format of the User Info field (the modified User Info or the normal User Info). Therefore, as shown in FIG. 23, even in the case where the Trigger Type is the Basic Trigger, the Trigger Dependent User Info subfield is not included in either the modified User Info or the normal User Info.

Setting the restriction information in the Common Info causes the restriction condition on data transmission to be equal for all OFDM-multiplexed terminals 400. However, the User Info includes no Trigger Dependent User Info subfield, and thus a reduction in the Trigger Frame size is achieved.

In the specific example 3, regardless of the format of the User Info field, the User Info includes no Trigger Dependent user Info field, and thus the size of all User Info fields are uniquely determined by the Trigger Type as in the specific example 1. Therefore, it becomes unnecessary for the terminal 400 to decode the AID12 subfield of each User Info field to detect the User Info field size, and thus simplification of the reception process performed by the terminal 400 is achieved.

Specific examples 1 to 3 of methods of specifying restriction information on uplink transmission data in a Trigger frame including a modified User Info have been described above.

In FIGS. 21 to 23, RA-RUs specified by one Trigger frame are, by way of example, contiguous RUs. However, the RA-RUs are not limited to contiguous RUs. RUs located in discontinuous areas separated from each other (not shown) may be specified by one Trigger frame as in the first embodiment (for example, FIG. 13, FIG. 15, and FIG. 18).

Furthermore, the above-described operations according to the present embodiment are not limited to the case where the Trigger Type is the Basic Trigger. For example, when the Trigger Type allows RA transmission and the Trigger Type includes Trigger Dependent User Info, the operations according to the present embodiment are possible in a similar manner as described above, and similar effects can be achieved.

The embodiments of the present disclosure have been described above.

Figure 24:
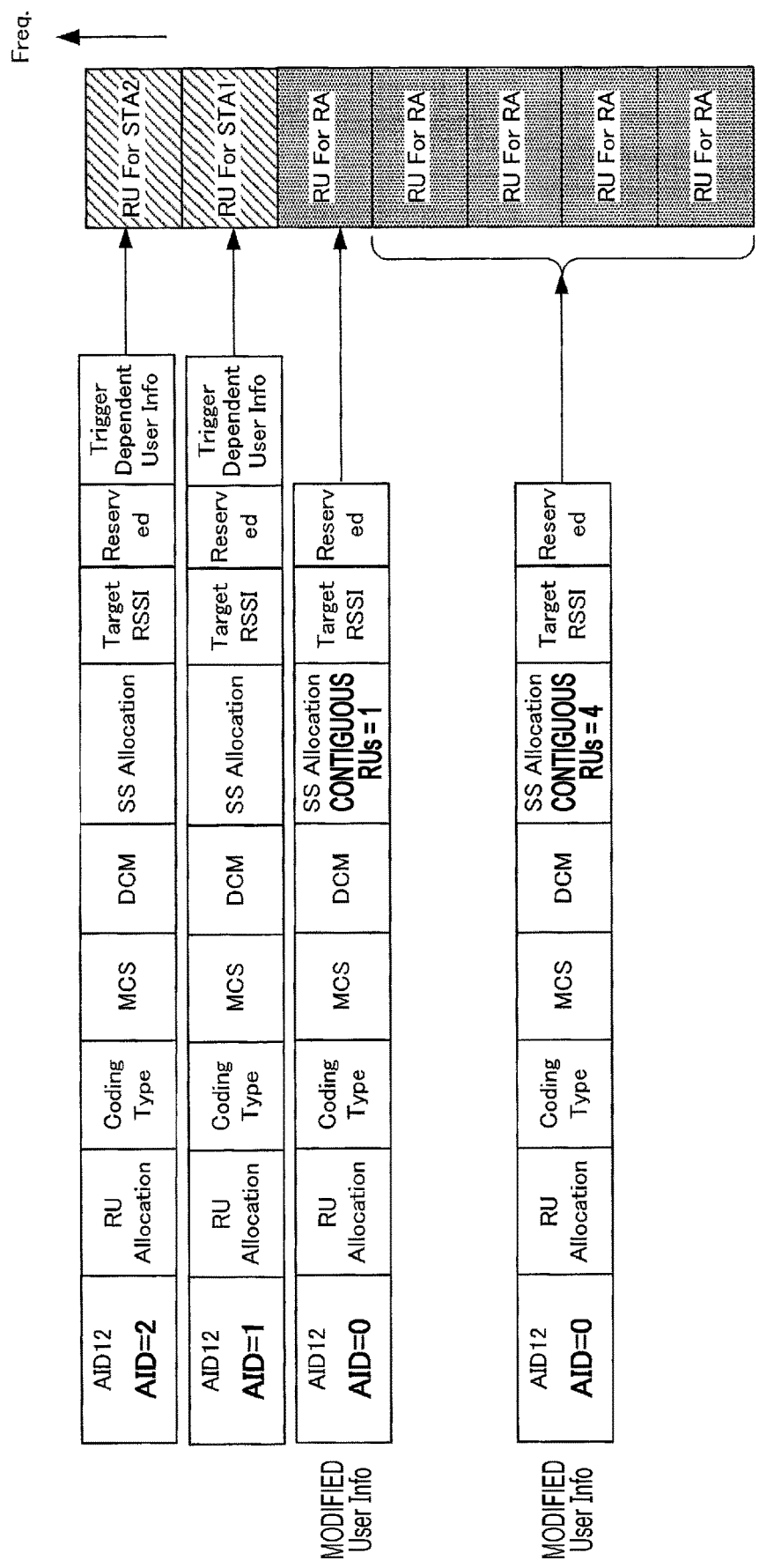
FIG. 24 is a diagram illustrating an example of an RA-RU specified by a User Info according to another embodiment.

OTHER EMBODIMENTS (1) As shown in FIG. 24, one Trigger frame may include a mixture of specifying of an RA-RU using a modified User Info or a normal User Info described above with reference to the embodiments and specifying of a Scheduled access RU.

(2) In the embodiments described above, the methods of specifying the modified User Info using an unused AID have been explained. Instead of an unused AID, the modified User Info may be specified using a Reserved area (1 bit) in a User Info field. For example, one bit in the Reserved area may be used to specify the format of the User Info field indicating whether the format is the modified User Info or the normal User Info. Alternatively, the modified User Info may be specified using another subfield in the User Info field. For example, AID=0 may specify an RA-RU, and, without disabling DCM in the RA-RU, one bit of DCM may be used to specify the format to indicate whether the format is the modified User Info or the normal User Info.

(3) In specifying an RA-RU, a predetermination may be made as to the order, in the Trigger frame, of notifying the normal User Info (specified by AID=0) and the modified User Info (specified by an used AID with a value of AID≠0). This makes it possible to achieve simplification of the reception process performed by the terminal.

In the specifications, to simplify the reception process at the terminal, the notification order is defined such that, a User Info in the Trigger frame, a notification of a Scheduled access RU is given and then a notification of an RA-RU is given. In a case where notifications of RA-RUs are given by a mixture of the normal User Info and the modified User Info as in the present embodiment, predetermining of the notification order of these User Info's makes it possible to simplify the reception process at the terminal.

Figure 25:
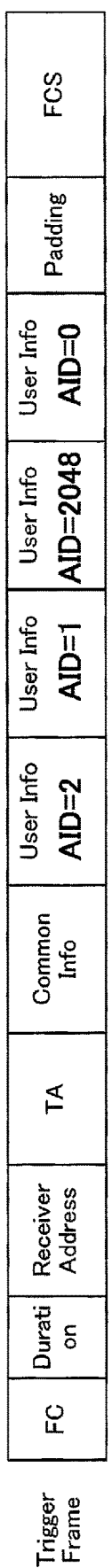
FIG. 25 is a diagram illustrating an example of a configuration of a Trigger frame according to another embodiment.

For example, as shown in FIG. 25, the notification order may be predetermined such that the notification is to be given in order "notification of a Scheduled access RU (in the example shown in FIG. 25, User Info's specifying individually terminals with AID=1, 2)", "notification of an RA-RU using a modified User Info (in the example shown in FIG. 25, specified by AID=2048), and "notification of an RA-RU using a normal User Info (in the example shown in FIG. 25, specified by AID=0). By predetermining the notification order as described above, when there is an overlap between specified RA-RUs as in embodiments described above (for example, see FIG. 16), the reception process at the terminal can be simplified, for example, such that the instruction in modified User Info is overwritten with the normal User Info.

Furthermore, the notification order of a plurality of modified User Info's included in one Trigger frame may be predetermined such that the notification is to be given in the descending order of the number of contiguous RUs specified by modified User Info's. By predetermining the notification order as described above, when there is an overlap between specified RA-RUs as in embodiments described above (for example, see FIG. 11), the reception process at the terminal can be simplified, for example, such that a modified User Info specifying a large number of contiguous RUs is overwritten with a modified User Info specifying a small number of contiguous RUs.

(4) The present disclosure may be implemented by software, hardware, or software in corporation with hardware. Each functional block described in the embodiments may be partially or totally implemented by an LSI, which is an integrated circuit. Each process described in the embodiments may be partially or totally controlled by one LSI or a combination of LSIs. One LSI may be realized by one chip. One chip may include a part or all functional blocks. Each LSI may include data input and output. The LSI may also be called an IC, a system LSI, a super LSI, or an ultra LSI depending on the integration density. The method of implementing the integrated circuit is not limited to the LSI, but the integrated circuit may be implemented in the form of a dedicated circuit or a general-purpose processor. The integrated circuit may also be realized using an FPGA (Field Programmable Gate Array) that can be programmed after the LSI is produced or a reconfigurable processor that is allowed to be reconfigured in terms of the connection or the setting of circuit cells in the inside of the LSI. The present disclosure may be implemented by digital or analog processing. When a new integration circuit technique other than LSI techniques are realized in the future by an advance in semiconductor technology or related technology, the functional blocks may be realized using such a new technique. Use of biotechnology is potentially possible.

A communication apparatus according to the present disclosure includes a trigger signal generator that generates a trigger signal instructing an uplink signal transmission, wherein in a case where the trigger signal includes a first terminal information field specifying one or more contiguous resource units for random access, an unused ID that is not to be used as a terminal ID is set in the terminal ID subfield in the first terminal information field, and a transmitter that transmits the generated trigger signal.

In the communication apparatus according to the present disclosure, when a resource unit for random access is specified, one value of an unused ID is set in a terminal ID subfield.

In the communication apparatus according to the present disclosure, in a case where a trigger signal includes a plurality of first terminal information fields, when there is an overlap at one or more of contiguous resource units for random access specified respectively by the first terminal information fields, priority of a plurality of first terminal information fields for the overlapping resource units is determined such that priority is given to an instruction described in a first terminal information field specifying a smaller number of resource units.

In the communication apparatus according to the present disclosure, when a resource unit for random access is specified, there are a plurality of values of unused IDs that can be set in a terminal ID subfield.

In the communication apparatus according to the present disclosure, the trigger signal generator sets a first unused ID value, of a plurality of unused ID values, in a terminal ID subfield in a first terminal information field, and sets a second unused ID value in a terminal ID subfield in a second terminal information field specifying one resource unit for random access. In a case where there is an overlap between a resource unit specified by the first terminal information field and a resource unit specified by the second terminal information field, priority in the overlapping resource units is determined such that priority is given to an instruction indicated in the second terminal information field.

In the communication apparatus according to the present disclosure, each of the unused ID values is associated with a restriction condition imposed on a terminal that transmits a random access signal.

In the communication apparatus according to the present disclosure, in a case where a trigger signal is of a type that imposes no restriction on the format of an uplink signal, the trigger signal generator sets information in the first terminal information field to specify a restriction on the uplink signal in transmission.

In the communication apparatus according to the present disclosure, in a case where a trigger signal is of a type that imposes no restriction on the format of an uplink signal, a restriction on an uplink signal in transmission is applied to a terminal instructed to use one or more contiguous resource units for random access specified by the first terminal information field of the trigger signal.

In the communication apparatus according to the present disclosure, in a case where a trigger signal is of a type that imposes no restriction on the format of an uplink signal, the trigger signal generator sets information indicating a restriction on an uplink signal in transmission not in the first terminal information field but in a common information field including information common for terminals.

The communication method according to the present disclosure includes generating a trigger signal instructing an uplink signal transmission. In a case where the trigger signal includes a first terminal information field specifying one or more contiguous resource units for random access, an unused ID unused as a terminal ID is set in a terminal ID subfield in the first terminal information field, and the generated trigger signal is transmitted.

INDUSTRIAL APPLICABILITY

An aspect of the present disclosure is useful for effectively using redundant fields or for reducing redundant fields.

REFERENCE SIGNS LIST 100, 300 AP
101 RA resource controller
102 User Info controller
103, 205 AID controller
104, 302 Trigger frame generator
105, 208 transmission signal modulator
106, 202 radio transmitter/receiver
107, 201 antenna
108, 203 reception signal demodulator
109 quality estimator
200, 400 terminal
204 Trigger frame decoder
206 RA resource determination unit
207, 402 RA generator
301 Trigger dependent information controller
401 Trigger dependent information acquisition unit

The invention claimed is:

1. A communication apparatus, comprising:
a receiver which, in operation, receives a trigger frame comprising a first User Information field, a second User Information field, and a third User Information field, the first User Information field comprising a first terminal ID subfield and a first Resource Unit (RU) Allocation subfield, the second User Information field comprising a second terminal ID subfield and a second RU Allocation subfield, and the third User Information field comprising a third terminal ID subfield and a third RU Allocation subfield,
wherein a first value other than a value used for a terminal ID is set to the first terminal ID subfield for Random Access of a station associated with an access point, the first RU Allocation subfield indicates a first starting RU of one or more first contiguous Random Access RUs (RA-RUs), and the first User Information field further comprises a first number of RA-RU subfield indicating a first number of RUs in the one or more first contiguous RA-RUs,
a second value other than a value used for a terminal ID is set to the second terminal ID subfield for Random Access of a station unassociated with the access point, the second RU Allocation subfield indicates a second starting RU of one or more second contiguous RA-RUs, and the second User Information field further comprises a second number of RA-RU subfield indicating a second number of RUs in the one or more second contiguous RA-RUs, and
a third value used for a terminal ID is set to the third terminal ID subfield for Scheduled Access of a station associated with the access point, and all of User Information fields for Scheduled Access including the third User Information field precede all of User Information fields for Random Access including the first User Information field and the second User Information field in the trigger frame; and
a transmitter,
wherein, in a first case where the communication apparatus is associated with the access point, the transmitter transmits an uplink signal using at least one of the one or more first contiguous RA-RUs, and,
in a second case where communication apparatus is unassociated with the access point, the transmitter transmits an uplink signal using at least one of the one or more second contiguous RA-RUs.

2. The communication apparatus according to claim 1, wherein the one or more first contiguous RA-RUs that are allocated by the first User Information field do not overlap with the one or more second contiguous RA-RUs that are allocated by the second User Information field.

3. The communication apparatus according to claim 1, wherein a coding type and a Modulation and Coding Scheme (MCS) are configured separately for the one or more first contiguous RA-RUs that are allocated by the first User Information field and the one or more second contiguous RA-RUs that are allocated by the second User Information field.

4. A communication method implemented by a communication apparatus, the communication method comprising:
receiving a trigger frame comprising a first User Information field, a second User Information field, and a third User Information field, the first User Information field comprising a first terminal ID subfield and a first Resource Unit (RU) Allocation subfield, the second User Information field comprising a second terminal ID subfield and a second RU Allocation subfield, and the third User Information field comprising a third terminal ID subfield and a third RU Allocation subfield,
wherein a first value other than a value used for a terminal ID is set to the first terminal ID subfield for Random Access of a station associated with an access point, the first RU Allocation subfield indicates a first starting RU of one or more first contiguous Random Access RUs (RA-RUs), and the first User Information field further comprises a first number of RA-RU subfield indicating a first number of RUs in the one or more first contiguous RA-RUs,
a second value other than a value used for a terminal ID is set to the second terminal ID subfield for Random Access of a station unassociated with the access point, the second RU Allocation subfield indicates a second starting RU of one or more second contiguous RA-RUs, and the second User Information field further comprises a second number of RA-RU subfield indicating a second number of RUs in the one or more second contiguous RA-RUs, and
a third value used for a terminal ID is set to the third terminal ID subfield for Scheduled Access of a station associated with the access point, and all of User Information fields for Scheduled Access including the third User Information field precede all of User Information fields for Random Access including the first User Information field and the second User Information field in the trigger frame;
in a first case where the communication apparatus is associated with the access point, transmitting an uplink signal using at least one of the one or more first contiguous RA-RUs; and
in a second case where communication apparatus is unassociated with the access point, transmitting an uplink signal using at least one of the one or more second contiguous RA-RUs.

5. The communication method according to claim 4, wherein the one or more first contiguous RA-RUs that are allocated by the first User Information field do not overlap with the one or more second contiguous RA-RUs that are allocated by the second User Information field.

6. The communication method according to claim 4, wherein a coding type and a Modulation and Coding Scheme (MCS) are configured separately for the one or more first contiguous RA-RUs that are allocated by the first User Information field and the one or more second contiguous RA-RUs that are allocated by the second User Information field.

\* \* \* \* \*